United States Patent
Sanpei et al.

[11] Patent Number: 6,031,675
[45] Date of Patent: *Feb. 29, 2000

[54] RECORDING MEDIUM DEVICE PROVIDED WITH ERRONEOUS RECORDING PREVENTION MECHANISM

[75] Inventors: Takaaki Sanpei; Hiroshi Meguro, both of Miyagi, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/817,955

[22] PCT Filed: Sep. 2, 1996

[86] PCT No.: PCT/JP96/02473

§ 371 Date: Apr. 30, 1997

§ 102(e) Date: Apr. 30, 1997

[87] PCT Pub. No.: WO97/08698

PCT Pub. Date: Mar. 6, 1997

[30] Foreign Application Priority Data

| Aug. 31, 1995 | [JP] | Japan | P7-224005 |
| Feb. 20, 1996 | [JP] | Japan | P8-032519 |
| Mar. 8, 1996 | [JP] | Japan | P8-052138 |
| Mar. 8, 1996 | [JP] | Japan | P8-052139 |

[51] Int. Cl.[7] ............................ G11B 15/04; G11B 5/78
[52] U.S. Cl. .............................. 360/60; 360/134
[58] Field of Search .................... 369/77.2, 75.2, 369/291; 360/132, 133, 60, 134

[56] References Cited

U.S. PATENT DOCUMENTS

| 4,044,386 | 8/1977 | Satou et al. | 360/60 |
| 4,320,421 | 3/1982 | Larson et al. | 360/60 |
| 4,460,930 | 7/1984 | Takahashi | 360/60 |
| 4,607,299 | 8/1986 | Oishi et al. | 360/60 |
| 4,734,812 | 3/1988 | Tanaka et al. | 360/132 |
| 4,780,783 | 10/1988 | Osawa et al. | 360/132 |
| 4,844,377 | 7/1989 | Shiomi et al. | 242/198 |
| 4,860,127 | 8/1989 | Takahashi et al. | 360/60 |
| 4,908,725 | 3/1990 | Iwahashi | 360/132 |
| 5,184,255 | 2/1993 | Lowry et al. | 360/60 |
| 5,218,502 | 6/1993 | Tanaka et al. | 360/132 |
| 5,367,422 | 11/1994 | Fujisawa et al. | 360/133 |
| 5,504,644 | 4/1996 | Sasaki et al. | 360/132 |

FOREIGN PATENT DOCUMENTS 7-141834  6/1995  Japan .

*Primary Examiner*—Stuart S. Levy
*Assistant Examiner*—Tod Kupstas
*Attorney, Agent, or Firm*—Frommer Lawrence & Haug, LLP; William S. Frommer

[57] ABSTRACT

A recording medium device adapted so that a recording medium on which information signals are recorded is accommodated. This recording medium device comprises a cartridge body within which the recording medium on which information signals are recorded is accommodated, and an erroneous recording prevention member including a portion of detection detected by a detection mechanism of the recording/reproduction unit side, and attached to the cartridge body so that it can be moved within the range between a first position where the portion of detection is detected by the detection mechanism and a second position where it is not detected by the detection mechanism. This erroneous recording prevention member is attached to the cartridge body so that the portion of detection can be moved within the range between the first position and the second position by holding or clamping a portion of the cartridge body by a holding portion provided at the base end portion side where the portion of detection is provided and inserting an insertion portion provided at the front end side of the holding portion from the external side toward the internal side of the cartridge body.

21 Claims, 17 Drawing Sheets

RECORDING MEDIUM DEVICE PROVIDED WITH ERRONEOUS RECORDING PREVENTION MECHANISM

FIELD OF THE INVENTION

This invention relates to a recording medium device adapted so that a recording medium on which information signals are recorded such as a magnetic tape or an optical disc, etc. is accommodated within the cartridge body, and more particularly to a recording medium device provided with an erroneous recording prevention mechanism for preventing erasure of previously recorded information signals due to erroneous overwrite recording of information signals onto a recording medium accommodated within the cartridge body.

BACKGROUND OF THE INVENTION

Hitherto, in an information processing equipment for processing information signals such as computer, etc., an external storage (memory) unit is used for recording and retaining information signals which have been processed by this equipment, or recording information signals which are to be processed by the information processing equipment. For such an external storage unit, a recording/reproduction apparatus (unit) using a recording medium device adapted so that a recording medium on which information signals are recorded such as a magnetic tape or an optical disc, etc. is accommodated within the cartridge body.

A recording medium device in the form of a tape cartridge used in such a recording/reproduction unit is shown in FIG. 1. This tape cartridge 500 includes a cartridge body 501, a substantially rectangular cover member 502 formed by molding transparent synthetic resin material, e.g., polycarbonate resin, etc. and a base plate 503 joined to the cover member 502 by screws, etc. with the base plate 503 formed by a metal plate such as an aluminum plate, etc. Within the cartridge body 501, a pair of tape reels (not shown) are rotatably accommodated. Thus, a magnetic tape 504 withdrawn from one tape reel passes through the cartridge body 501 along the front portion 501a thereof, and is wound onto the other tape reel.

At one side of the front portion 501a of the tape cartridge 500, a cover body 505 is rotatably attached for opening/closing an opening portion for receiving a magnetic head which relatively comes into slidable contact with the magnetic tape 504 to perform recording and/or reproduction of information signals. Moreover, substantially at the central portion of the front portion 501a, an opening portion 507 is provided which allows the outer circumferential portion of a belt drive roller 506 for traveling the magnetic tape 504 at a constant velocity to extend outwardly therefrom. In addition, within the tape cartridge 500, an endless belt (not shown) for driving the tape reels is disposed. This endless belt is moved when the belt drive roller 506 is rotated.

In operation, when this tape cartridge 500 is loaded into the recording/reproducing unit as an auxiliary memory unit, the cover body 505 is opened. As a result, the magnetic head of the recording/reproduction unit side is received through the opening portion for recording/reproduction to lightly touch the signal recording surface of the magnetic tape 504. Moreover, a drive roller of the recording/reproduction unit side is inserted into the cartridge body 501 through the drive opening portion 507 provided at the front side of the cartridge body 501 to come into contact with the belt drive roller 506. Then, when the drive roller of the recording/reproduction unit is rotationally driven, the tape reels are rotated through the belt drive roller 506 so that the magnetic tape 504 moves at the contact velocity, whereby recording and/or reproduction of information signals are carried out by the magnetic head which is slidably in contact with the magnetic tape 504.

Meanwhile, this tape cartridge 500 includes an erroneous recording prevention mechanism 508 for preventing erasure of previously recorded information signals due to erroneous overwrite recording of information signals performed on the magnetic tape 504.

This erroneous recording prevention mechanism 508 includes, as shown in FIG. 2, an erroneous recording detection hole 509 provided at the cover member 502 and positioned at one side of the front portion 501a of the cartridge body 501, and an erroneous recording prevention member 510 attached to the cover member 502 so that it can be moved within the range between a first position where it opens the erroneous recording detection hole 509 and a second position where it closes the erroneous recording detection hole 509.

As shown in FIG. 2, the erroneous recording detection hole 509 is provided at the front portion 501a of the cartridge body 501 in a manner to correspond to a recessed portion 511 for guiding movement thereof extending over a main surface portion 501b of the cartridge body 501 where the erroneous recording prevention member 510 is disposed so that it can be moved.

Further, the erroneous recording prevention member 510 disposed within the recessed portion 511 includes, as shown in FIG. 2, a portion of detection (detected portion when viewed from the recording medium device) 513 opposite to the erroneous recording prevention hole 509, a holding portion 521 including a movement guide piece 512 and a supporting piece 514 extended in parallel in a manner opposite to each other from the portion of detection 513, and an engagement projection 515 projecting (hereinafter simply referred to as "projected" as occasion may demand) from the surface side opposite to the supporting piece 514 of the front end side of the movement guide piece 512. In this case, the portion of the detection member 513 is formed so as to have a size (dimensions) sufficient to close the erroneous recording detection hole 509.

The erroneous recording prevention member 510 as described above is attached to the cartridge body 501 as shown in FIG. 3 in a manner to extend the movement guide piece 512 formed of the holding portion 521 toward a main surface portion 501b side of the recessed portion 511, to insert the supporting piece 514 into the erroneous recording detection hole 509, and to clamp or hold a bottom surface portion 516 of the recessed portion 511 by the movement guide piece 512 and the supporting piece 514. Moreover, the erroneous recording prevention member 510 is formed so that when it is attached to the cartridge body 501, an engagement projection 515 projecting from the front end side of the movement guide piece 512 is engaged with an engagement groove 517 formed in the bottom surface portion 516 of the recessed portion 511. Further, the erroneous recording prevention member 510 is caused to undergo movement operation in the direction indicated by arrow A and in the direction indicated by arrow B in FIGS. 1 and 4 within the range between the first position where the erroneous recording detection hole 509 is opened as shown in FIGS. 4 and 5 and the second position where the erroneous recording detection hole 509 is closed, which is indicated by single dotted lines in FIG. 4 while allowing the engagement projection 515 to be guided by the engagement groove 517.

The erroneous recording prevention member 510 is adapted so that when it is moved to the first or second positions, a side edge of the detection member 513 is held by a holding projection 518 projected from the central portion of a side edge 509c of the lower side in the figure of the erroneous recording detection hole 509 of the cover member 502, whereby the erroneous recording prevention member 510 is held at the position where it is moved to the first or the second position.

Further, the erroneous recording prevention member 510 is caused to undergo movement operation in the direction indicated by arrow A in FIG. 4 within the recessed portion 511 as a movement guide. Thus, when the erroneous recording prevention member 510 is placed wherein a portion of the detection member 513 is moved to the second position where it closes the erroneous recording detection hole 509 as indicated by single dotted lines in FIG. 4, the portion of the detection member 513 is detected by the erroneous recording detection mechanism provided at the recording/reproducing unit side into which the tape cartridge 500 is loaded. Namely, when the tape cartridge 500 is loaded into the recording/reproduction unit, the detection element of the erroneous recording detection mechanism is pressed by the detection member portion. When the portion of the detection member 513 is detected by the erroneous recording detection mechanism of the recording/reproduction unit, the recording/reproduction unit is placed in its recording operation mode where recording of information signals can be performed with respect to the magnetic tape 504.

Moreover, the erroneous recording prevention member 510 is caused to undergo movement operation in the direction indicated by arrow B in FIG. 4 within the recessed portion 511 as a movement guide. When the portion of the detection member 513 indicated by solid line in FIG. 4 is moved to the first position, the erroneous recording detection hole 509 is opened. Thus, the portion of the detection member 513 is not detected by the detection element of the erroneous recording detection mechanism provided at the recording/reproduction unit side. At this time, the erroneous recording detection mechanism is placed in an inoperative state where the detection element is projected into the erroneous recording prevention hole 509 to stop the recording operation mode, such that recording of information signals onto the magnetic tape 504 is impossible. Namely, when the erroneous recording prevention member 510 is moved to the first position, the tape cartridge 500 is placed such that re-recording of information signals onto the magnetic tape 504 is impossible. Thus, erasing of information signals recorded on the magnetic tape 504 is prevented.

In the above-described tape cartridge 500, the erroneous recording prevention member 510 is attached so that it can be moved within the recessed portion 511 so that the bottom surface portion 516 of the recessed portion 511 of the cartridge body 501 is held by the holding portion 521 formed by the movement guide piece 512 and the supporting piece 514 in such a manner to put it therebetween to allow the engagement projection 515 to be relatively engaged with the engagement groove 517. Namely, the erroneous recording prevention member 510 is attached in such a manner that it moves along the surface of the external side of the cartridge body 501 such that it holds a portion of the cartridge body 501 by the holding portion 521 provided at the base end portion side.

Moreover, since the erroneous recording prevention member 510 is formed so as to have a size (dimensions) to open or close the erroneous recording detection hole 509 provided at the cartridge body 501 at the position where the erroneous recording prevention member 510 does not impede movement of the magnetic tape 504 within the cartridge body 501, limitations in the shape and/or size thereof exist, and it is difficult to stiffly or rigidly attach the erroneous recording prevention member 510 to the cover member 502. For this reason, when a large force is applied to the tape cartridge 500, the erroneous recording prevention member easily slips off from the cover member 502.

Further, in such cases that, e.g., writing appliance or nail, etc. is caught by the movement guide piece 512 or the portion of the detection member 513, the erroneous recording prevention member 510 may be easily deformed so that it slips off from the cover member 502. In addition, when a nail or pin, etc. is inserted into the portion between the erroneous recording prevention member 510 and the recessed portion 511 for movement guide to break it, the erroneous recording prevention member 510 can be detached from the cover member 502 with ease.

When the erroneous recording prevention member 510 is inadvertently moved as described above, a possibility exists that the tape cartridge 500 may be set to the recording unable state from the recordable state of information signals, or to the recordable state from the recording unable state, so recording of a desired information signal becomes impossible, or overwrite recording of information signals may be performed so that information signals previously recorded on the magnetic tape 504 are erroneously erased. In addition, when the erroneous recording prevention member 510 slips off from the cartridge body 501, the erroneous recording prevention hole 509 remains opened. Thus, it becomes impossible to record a desired information signal with respect to the magnetic tape 504.

Moreover, in the tape cartridge 500 used as a recording medium of the recording/reproduction unit used in the auxiliary unit for computer, the recording capacity of information signals is larger and the tape cartridge 500 is compact and light in weight. The large recording capacity is attained, e.g., by improving the composition or material, etc. of the magnetic medium used for the magnetic tape 504 and by increasing the number of windings of the magnetic tape 104 wound on the tape reel. However, in the tape cartridge 500, when the number of windings of the magnetic tape 504 is increased, the outside diameter of the tape reel in turn increases. As a result, it becomes difficult to hold or maintain the clearances between the tape reels and respective members or respective portions disposed within the cartridge body 501.

Further, within the tape cartridge 500 adapted so that the magnetic tape is accommodated therewithin, plural guide pins or guide rollers, etc. forming the traveling path of the magnetic tape 504 are provided on a base plate 503. However, where the tape reel has a large diameter as described above, such a countermeasure to change the positions where these guide pins or guide rollers are disposed is required. In the tape cartridge 500, the magnetic tape 504 is traveled along the front portion 501a as described above, and the erroneous recording prevention mechanism 508 is disposed at the front portion 501a side.

In the case where such a countermeasure to positionally shift (change) guide pins or guide rollers toward the lateral side of the cartridge body 501, or the like is necessary in the tape cartridge 500 of this kind, these guide pins, etc. might be positioned in the movement area of the erroneous recording prevention member 510. As a result, it becomes impossible to positionally shift (change) the erroneous recording prevention member 510 to a desired position.

Moreover, the erroneous recording prevention mechanism is provided not only at the above-described tape cartridge 500 within which the magnetic tape 504 is accommodated, but also at the disc cartridge adapted so that a disc-shaped recording medium such as optical disc or magnetic disc, etc. is accommodated within the cartridge body formed by butt-joining rectangular pair of upper and lower halves. The erroneous recording prevention mechanism provided at this disc cartridge is also formed of an erroneous recording detection hole provided at the cartridge body and an erroneous recording prevention member caused to undergo movement operation within the range between a first position and a second position when opening/closing this detection hole. The erroneous recording prevention member attached at this disc cartridge is assembled (attached) to the cartridge body in the state where the entirety is positioned between the upper half and the lower half in a manner such that the operation portion for allowing the erroneous recording prevention member to undergo movement operation is faced externally from the movement operation hole provided at the cartridge body. In the disc cartridge of this kind, since assembling between the upper half and the lower half is performed at the final assembly step, there is the problem that the erroneous recording prevention member assembled or attached in advance at the lower half side may slip off during the assembling step.

OBJECTS AND SUMMARY OF THE INVENTION

An object of this invention is to provide a recording medium device capable of easily attaching the erroneous recording prevention member with respect to the cartridge body, and capable of preventing the erroneous recording prevention member attached to the cartridge body from easily slipping off from the cartridge body.

Another object of this invention is to provide a recording medium device adapted for securely holding the erroneous recording prevention member at a position where the erroneous recording detection hole is opened and a position where it is closed, thus making it possible to securely set the condition where information signals are permitted to be recorded onto the recording medium and the condition where information signals are unable to be recorded onto the recording medium.

A recording medium device according to this invention proposed in order to attain objects as described above comprises a cartridge body accommodating a recording medium on which information signals are recorded, and an erroneous recording prevention member including a portion of a detection member (detected portion when viewed from the recording medium device) detected by a detection mechanism of the recording/reproduction unit side, and attached to the cartridge body so that it can be moved between a first position where the portion of detection is detected by the detection mechanism and a second position where it is not detected by the detection mechanism. This erroneous recording prevention member is attached to the cartridge body so that a portion of the detection member can be moved between the first position and the second position by holding or clamping a portion of the cartridge body by a holding portion provided at the base end portion side where the portion of the detection member is provided and inserting an insertion portion provided at the front end side of the holding portion from the external side toward the internal side of the cartridge body.

Since the erroneous recording prevention member is attached so that a portion of the cartridge body is held by the holding portion from the external side and the insertion portion provided at the holding portion front end side is inserted toward the interior of the cartridge body, the erroneous recording prevention member is prevented from easily slipping off from the cartridge body. Thus, the erroneous recording prevention member is stably moved between the first position and the second position.

Moreover, since the erroneous recording prevention member is attached to the cartridge body so that the insertion portion provided at the front end side of the holding portion is inserted into the cartridge body comes into pressure contact with the inner surface side of the cartridge body and provides a repulsive force (elasticity) thereto, the erroneous recording prevention member is attached to the cartridge body in the state where it is elastically held with respect to the cartridge body by the holding portion and the insertion portion. Thus, a firm or strong attachment state is achieved.

Further, the erroneous recording prevention member is attached to the cartridge body so that it is moved parallel to the front portion of the cartridge body, or within the range between a first position where the portion of detection is moved to the front portion side of the cartridge body and a second position where the portion of the detection member is moved toward the interior of the cartridge body.

Furthermore, the erroneous recording prevention member is attached so that it is rotated between a first position where the portion of the detection member is detected by the detection mechanism of the recording/reproduction unit side and a second position where it is not detected by the detection mechanism.

In addition, at the cartridge body, an erroneous recording prevention hole for permitting the detection element of the detection mechanism of the recording/reproduction unit side to be projected thereinto is provided. This erroneous recording prevention hole is opened or closed by the portion of the detection member of the erroneous recording prevention member moved within the range between the first position and the second position.

DETAILED DESCRIPTION OF CERTAIN PREFERRED EMBODIMENTS OF THE INVENTION

Further practical embodiments of a recording medium device according to this invention will now be described below with reference to the attached drawings.

In the respective embodiments disclosed below, the present invention relates to a tape cartridge using a magnetic tape as a recording medium on which information signals are recorded. Specifically, the tape cartridges of the respective embodiments disclosed herein are used in a recording/reproduction apparatus (unit) of an information processing equipment such as computer, etc, and are used for recording information signals such as data, etc. recorded at the information recording section of the information processing equipment, or information signals such as data, etc. delivered to the information processing equipment.

The first preferred embodiment of the tape cartridge to which this invention is applied will be first described.

Figure 1:
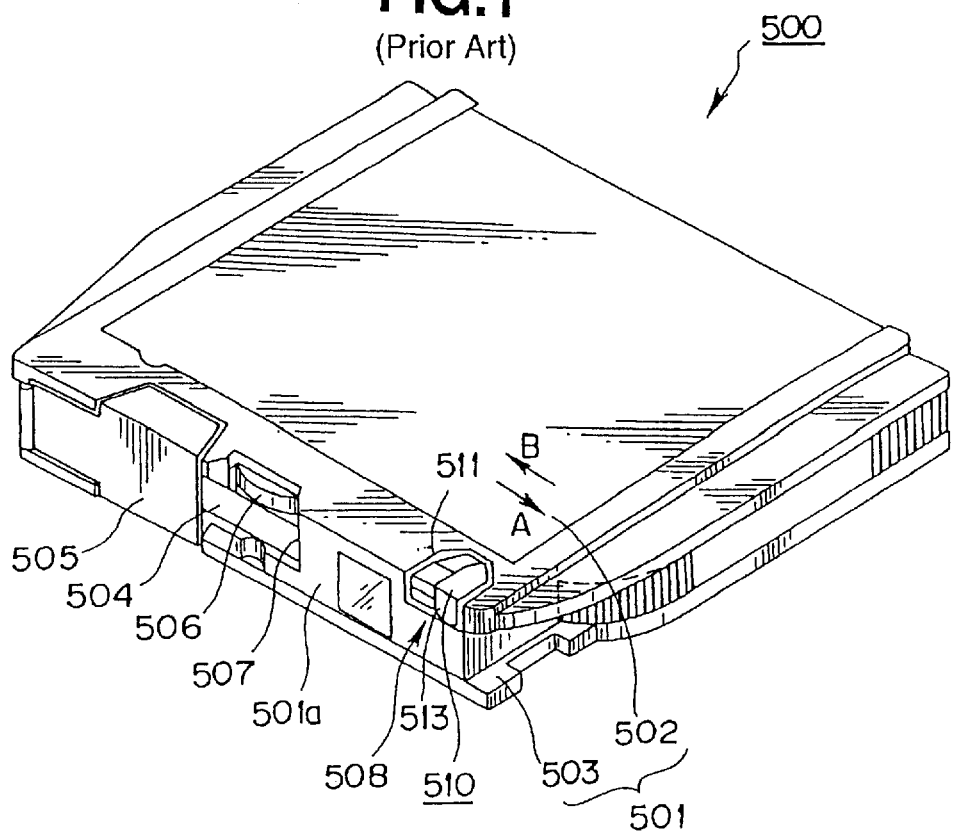
FIG. 1 is a perspective view showing a conventional tape cartridge.
Figure 2:
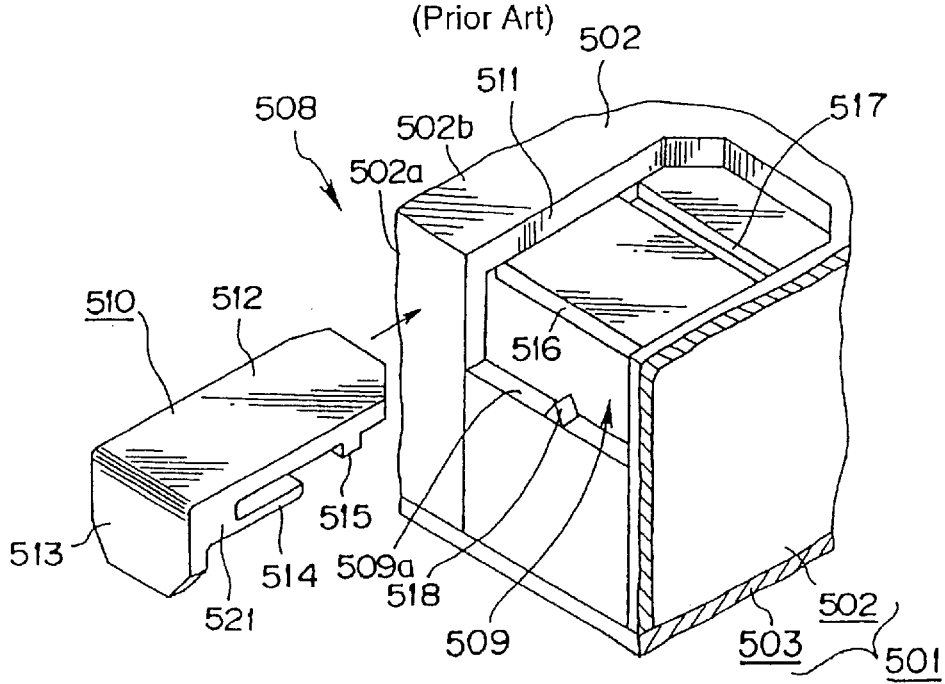
FIG. 2 is an exploded perspective view showing a conventional erroneous recording prevention mechanism provided at the tape cartridge.
Figure 3:
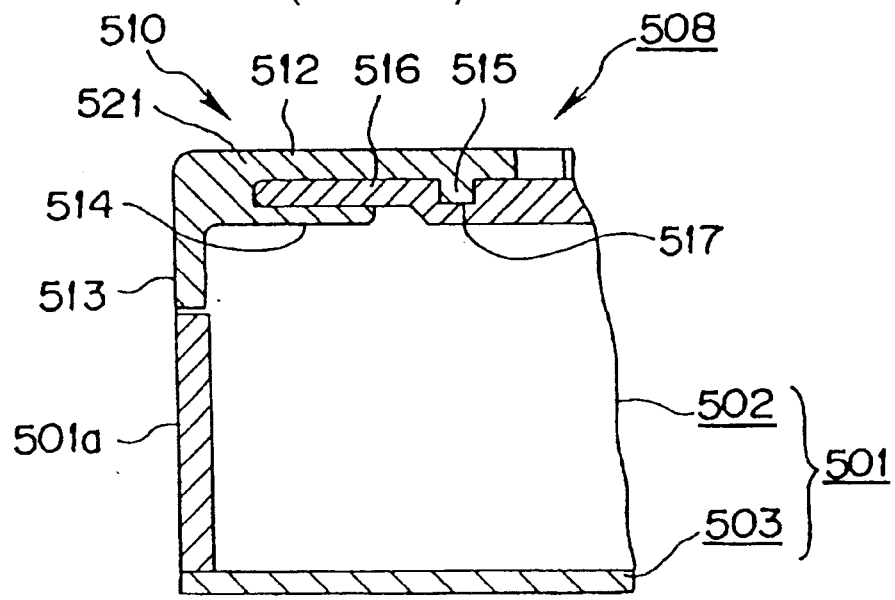
FIG. 3 is a cross sectional view showing the state where the erroneous recording prevention member of FIG. 2 is attached to the cartridge body.
Figure 4:
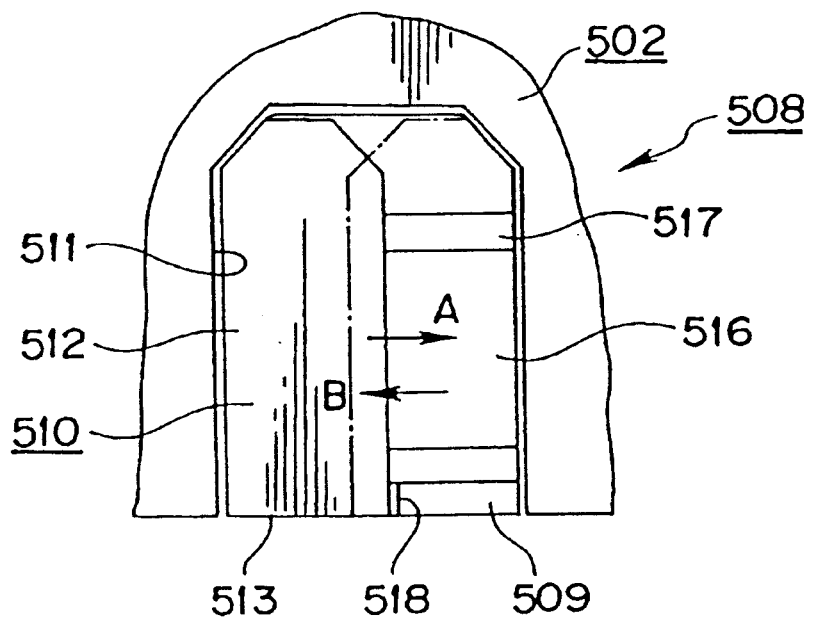
FIG. 4 is a plan view showing the erroneous recording prevention member of FIG. 2 attached to the tape cartridge.
Figure 5:
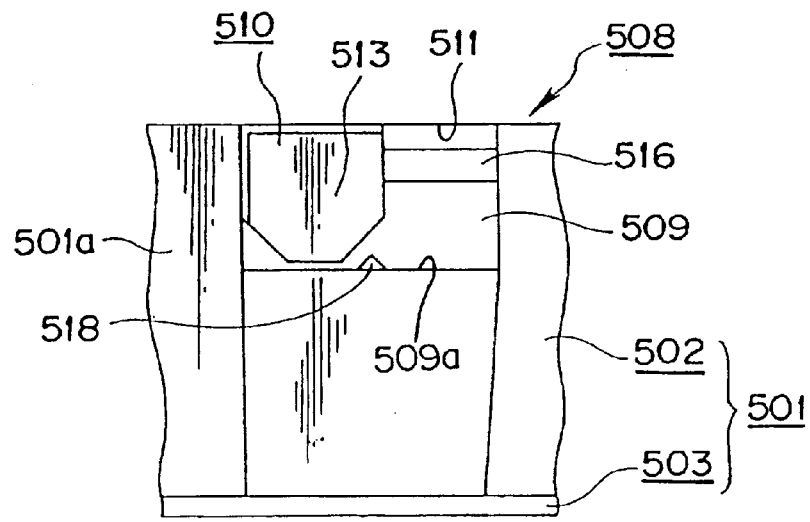
FIG. 5 is a front view showing the erroneous recording prevention member of FIG. 2 attached to the tape cartridge.
Figure 6:
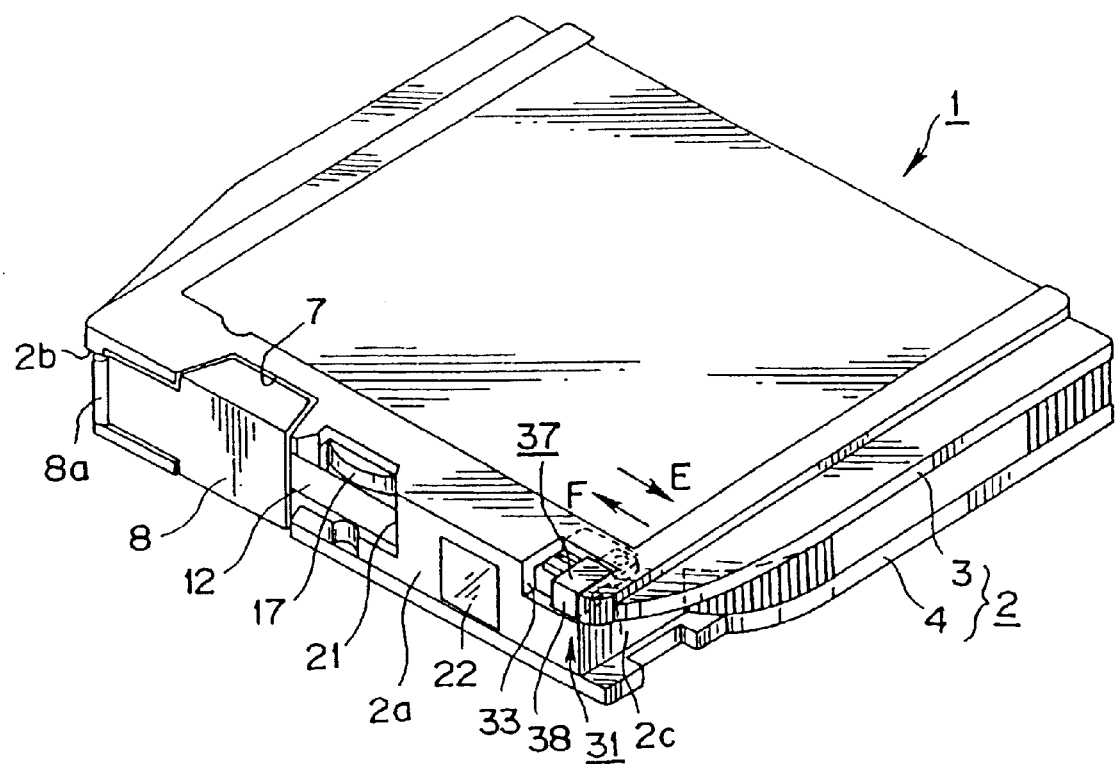
FIG. 6 is a perspective view showing a preferred embodiment of a tape cartridge in accordance with the teachings of the present invention.
Figure 7:
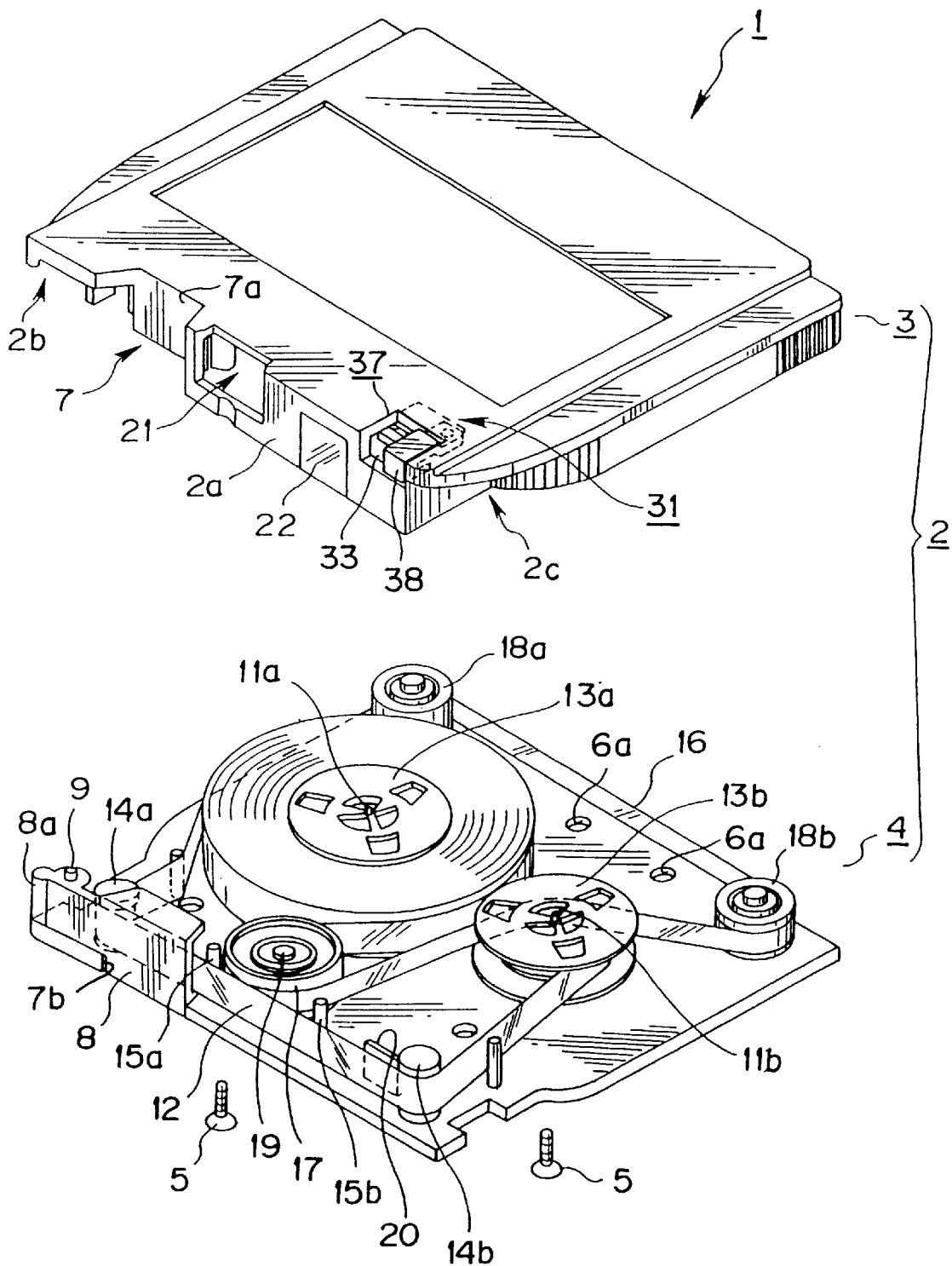
FIG. 7 is an exploded perspective view of the tape cartridge of FIG. 6.

This tape cartridge 1 includes, as shown in FIGS. 6 and 7, a cartridge body 2 substantially rectangular in shape including a cover member 3 and a base plate 4 which are butt-joined to each other. The cover member 3 is formed by a transparent synthetic resin material such as polycarbonate resin, etc. as a substantially rectangular box-shaped member in which the lower portion thereof is opened. The base plate 4 joined (connected) to the opened lower surface side of the cover member 2 is formed by punching a metal plate in the form of a thin plate of aluminum or aluminum alloy, etc. The cover member 3 and the base plate 4 are integrally assembled by set screws 5 (see FIG. 7) fastened into studs (not shown) projecting from the cover member 3 and studs 6 projecting from the inner surface of the cover member 3 relatively engaged with or into engagement holes 6a provided at the base plate 4 as shown in FIG. 8.

At both side portions of the front portion 2a side of the cartridge body 2, as shown in FIG. 6, engagement grooves 2b, 2c are provided which are engaged with projected portions for positioning the cartridge loading portion of the recording/reproduction unit side into which the tape cartridge 1 is loaded. These engagement grooves 2b, 2c respectively project from both sides of the cover member 3 and the side edge portions of the base plate 4.

Moreover, at one side of the front portion 2a of the cartridge body 2, as shown in FIG. 6, an opening portion 7 is provided for recording/reproduction in a recess form into which the magnetic head of the recording/reproduction unit is inserted into which the tape cartridge 1 is loaded. As shown in FIG. 7, this opening portion 7 is formed by a recess shaped portion 7a formed at the front side of the cover member 3 and a cut recessed portion 7b formed in a portion of the front end side of the base plate 4. As shown in FIG. 8, a magnetic tape 12 wound between a pair of tape reels 13a, 13b faces to the opening portion 7 for recording/reproduction. This magnetic tape 12 is drawn out into the opening portion 7 through tape drawing holes formed at the both sides of the opening portion 7, and passes along the bottom surface of the opening portion 7. Moreover, the opening portion 7 for recording/reproduction is formed so as to have a size (dimensions) such that the magnetic head of the recording/reproducing unit into which the tape cartridge 1 is loaded is permitted to be sufficiently inserted thereinto, and is opened or closed by a cover body 8 attached at the cartridge body 2. This cover body 8 is formed so as to have a shape formed substantially along the same plane surface as the front surface portion 2a of the cartridge body 2 as shown in FIG. 6 when the opening portion 7 is closed. In this position, the base end portion side thereof is rotatably supported on a support shaft 9 vertically provided at one corner portion of the front side of the base plate 4. Further, the cover body 8 is biased in a direction to close the opening portion 7 for recording/reproduction by a torsion spring 10 wound on the support shaft 9. In addition, the cover body 8 is adapted so that one end portion 8a of the base end portion side thereof is projected into an engagement recessed portion 2b of the cartridge body 2.

Figure 8:
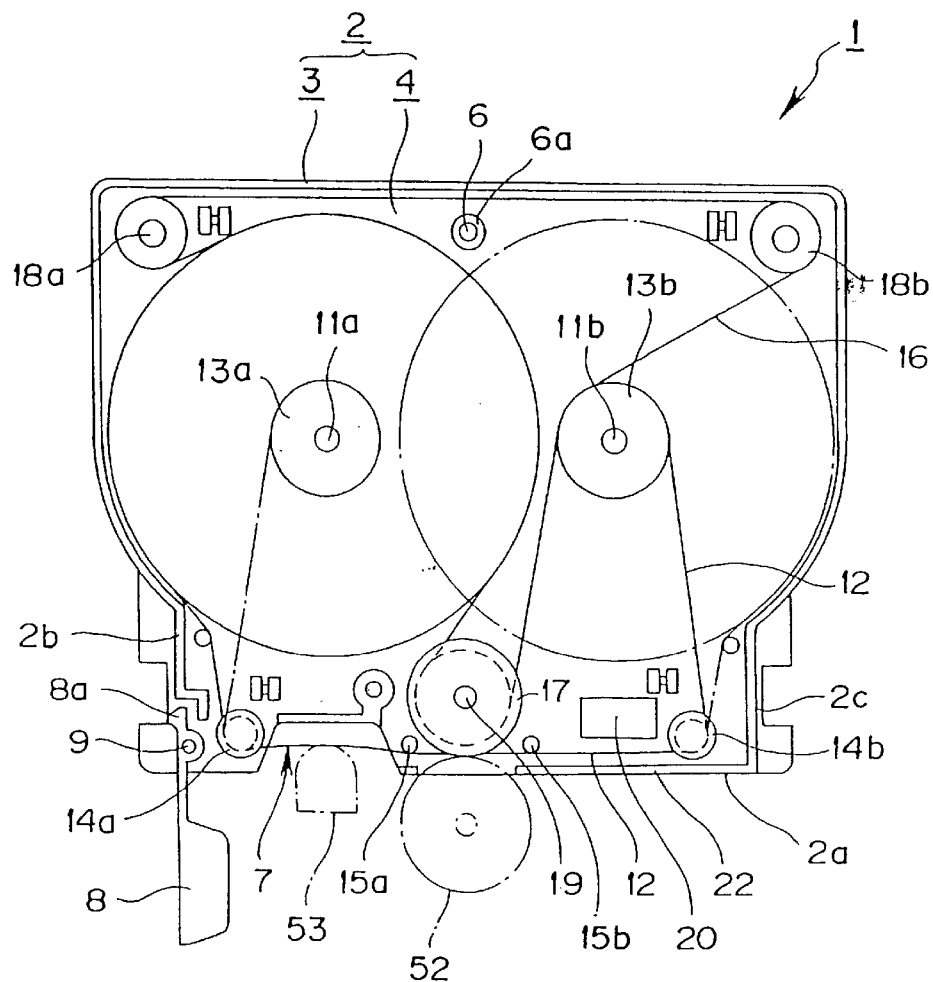
FIG. 8 is a plan view showing the traveling path for magnetic tape in the tape cartridge of FIG. 6.

Further, at the central portion of the base plate 4, as shown in FIGS. 7 and 8, a pair of reel support shafts 1a, 1b are vertically provided in parallel in the length direction of the base plate 4. A pair of tape reels 13a, 13b on which the magnetic tape 12 is wound are respectively rotatably supported on these tape reels 13a, 13b. Each of these tape reels 13a, 13b includes a hub around which the magnetic tape 12 is wound on the outer circumferential portion thereof, a lower flange formed integrally with the hub, and an upper flange assembled or attached with respect to the hub opposite to the lower flange. The transparent leader tapes of a predetermined length of the magnetic tape 12 are respectively connected to the both end portions thereof, wherein these leader tapes are respectively fixed on the hubs by clamp members.

Furthermore, at the base plate 4, a pair of guide rollers 14a, 14b are positioned at both corner portions of the front portion thereof. These guide rollers 14a, 14b are supported by support shafts vertically provided on the base plate 4. Flanges for supporting the both side ends of the magnetic tape 12 project from upper and lower end portions of the guide rollers 14a, 14b. In addition, at the base portion 4, tape guides 15a, 15b are vertically positioned at the extended portions of the cut recessed portion 7b forming the opening portion 7 for recording/reproduction and at both sides of belt drive roller 17 which will be described later.

Accordingly, in the above-mentioned tape cartridge 1, as shown in FIG. 8, the magnetic tape 12 withdrawn from one tape reel 13a is guided toward the outer circumferential portion of one guide roller 14a and is guided along the front portion 2a of the cartridge body 2 by the guide roller 14a. Further, the magnetic tape 12 passes along the front portion 2a of the cartridge body 2, and is guided toward the outer circumferential portion of the other guide roller 14b traversing the opening portion 7 for recording/reproduction which is supported between a pair of tape guides 15a, 15b. The magnetic tape 12 is guided toward the interior by the guide roller 14b, and is wound onto the other tape reel 13b.

Moreover, a tape drive mechanism for allowing the magnetic tape 12 to be moved along the above-described traveling path is provided within the tape cartridge 1. This tape drive mechanism includes, as shown in FIG. 7, an endless drive belt 16, a belt drive roller 17, and a pair of belt guide rollers 18a, 18b. The belt drive roller 17 is rotatably attached on a support shaft 19 vertically positioned substantially at the central portion in the length direction of the front side of the base plate 4. This belt drive roller 17 is formed by elastic material having an abrasion resistance. At the upper side portion of the outer circumferential portion on which the endless drive belt 16 is laid or positioned, a drive flange portion of relatively large diameter adapted to be in rolling contact with the drive roller of the recording/reproduction unit to receive transmitted rotational force is integrally provided.

As shown in FIG. 7, the belt guide rollers 18a, 18b are respectively positioned at both corner portions of the rear side of the base plate 4. These belt guide rollers 18a, 18b are respectively rotatably attached on support shafts 18c, 18d vertically provided on the base plate 4. In this embodiment, the belt guide rollers 18a, 18b are formed by elastic material such as synthetic rubber, etc. so as to attain a substantially tubular shape.

As shown in FIG. 8, the endless drive belt 16 is laid or positioned on the outer circumference of the small diameter portion of the belt drive roller 17 in contact with the outermost circumferential portion of the magnetic tape 12 wound on one tape reel 13a from one belt guide roller 18a by a predetermined tension. Moreover, the endless drive belt 16 is guided toward the other belt guide roller 18b in the state in contact with the outermost circumferential portion of the magnetic tape 12 wound on the other tape reel 13b from the belt drive roller 17 by a predetermined tension. Accordingly, the endless drive belt 16 undergoes endless traveling along the substantially T-shaped traveling path within the cartridge body 2 as shown in FIG. 7.

Further, an end portion detection mechanism for detecting the initial end or the terminating end of the magnetic tape 12 is provided within the tape cartridge 1. As shown in FIG. 8, this end portion detection mechanism includes a reflection member 20 assembled within an attachment hole provided parallel to the front edge of the base plate 4 and positioned in the vicinity of one guide roller 14b of the base plate 4. In this embodiment, the attachment hole is formed by the attachment portion of the reflection member 20, and creates an incident hole for detection light emitted from the light emitting element of the recording/reproduction unit side. The reflection member 20 is formed by, for example, a transparent polycarbonate resin having light transmissivity so that the cross-sectional shape is generally triangular, wherein a reflection material, such as silver foil, etc., is adhered to the inclined surface thereof. The reflection member 20 allows a detection light incident from the light emitting element of the recording/reproduction unit through the incident hole to undergo refraction and reflection on the inclined surface to guide it toward the front portion 2a of the cover member 3 to irradiate it onto the magnetic tape 12 traveling along the front portion 2a.

Moreover, substantially at the central portion of the front portion 2a of the cover member 3, an opening portion 21 for driving the magnetic tape is opened. Further, at the front portion 2a of the cover member 3, a terminating end detection portion 22 is provided adjacent to the magnetic tape driving opening portion 21. This terminating end detection portion 22 is formed by a thin thickness portion positioned in a manner opposite to the above-described reflection member 20.

Moreover, in this tape cartridge 1 including a cover member 3 and the base plate 4 combined to form the cartridge body 2, the belt drive roller 17 attached on the base plate 4 is positioned within the driving opening portion 21 of the side of the cover member 3. This belt drive roller 17 is positioned so that a portion of the outer circumferential portion of the drive flange portion is faced exteriorily from the driving opening portion 21 by the belt drive roller 17. In this embodiment, the recording/reproduction opening portion 7 is ordinarily closed by the cover body 8.

Further, in the tape cartridge 1 according to this invention, as shown in FIGS. 6 and 7, an erroneous recording prevention mechanism 31 is provided for setting a recording permissible state where recording of information signals is permitted with respect to the magnetic tape 12 accommodated within the tape cartridge 1 and an erroneous recording prevention state where recording of information signals onto the magnetic tape 12 is not permitted. This erroneous recording prevention mechanism 31 is formed at the cover member 3 opposite to the erroneous recording detection mechanism 31 disposed at the recording/reproduction unit side when the tape cartridge 1 is loaded into the recording/reproduction unit. The erroneous recording prevention mechanism 31 comprises an erroneous recording prevention member 37 attached at the position on the side opposite to the cover body 8 disposed at the front portion 2a of the cover member 3. This erroneous recording prevention member 37 is formed by molding synthetic resin material including polyacetal resin or ABS resin, etc. The erroneous recording prevention member 37 can be elastic in nature due to its formation by a molding synthetic resin. Further, since smoothness is rendered thereto, secure attachment can be achieved with respect to the cartridge body 2, and smooth operability can be realized.

Figure 9:
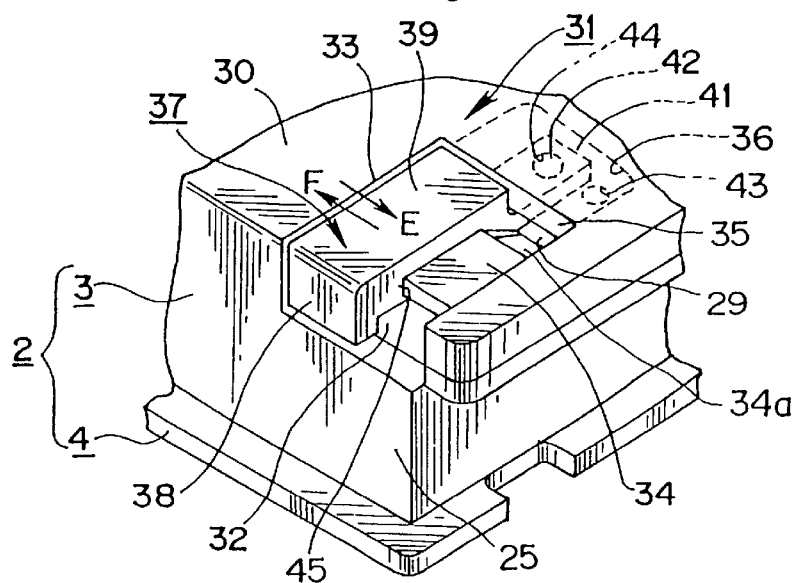
FIG. 9 is a perspective view specifically showing the erroneous recording prevention member attached to the cartridge body and moved to its second position.
Figure 10:
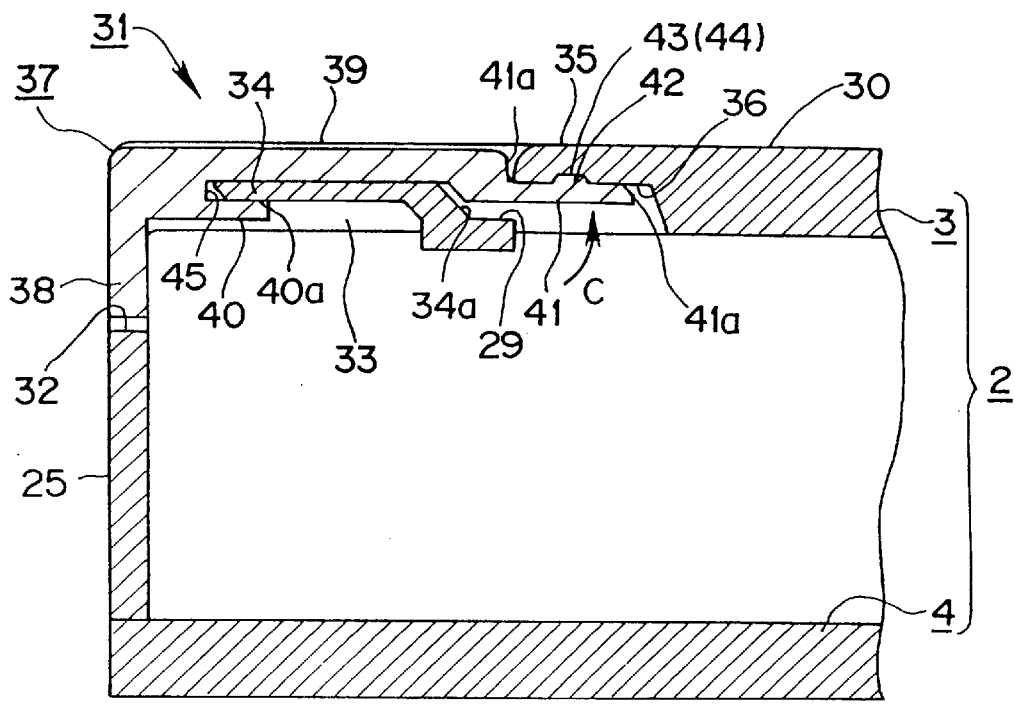
FIG. 10 is a cross sectional view showing the erroneous recording prevention member attached to the cartridge body.

Further, at the portion where the erroneous recording prevention member 37 is disposed on the cover member 3, as shown in FIGS. 9 and 10, a guide recessed portion 33 is provided within which the erroneous recording prevention member 37 is moved, and an erroneous recording detection hole 32 opened and closed by the erroneous recording prevention member 37.

The guide recessed portion 33 within which the erroneous recording prevention member 37 is disposed extends over the front 25 of the cover member 3 and a top plate 30 of the cover member 3 which is a surface portion opposite to the base plate 4 of the cartridge body 2. The bottom surface portion 34 of the guide recessed portion 33 serves as the portion clamped or held by the erroneous recording prevention member 37. This bottom surface portion 34 is formed in a plate form in parallel to the top plate 30 of the cover member 3 due to the erroneous recording detection hole 32 being formed at the front 25 of the cover member 3.

Further, at the internal end side of the portion extending on the top plate 30 of the guide recessed portion 33, an insertion groove 29 is formed into which an insertion piece 41 provided at the erroneous recording prevention member 37 is inserted as described later. This insertion groove 29 is formed in a portion of the bottom surface portion 34. An inclined surface 39a of the bottom surface 34 faces the insertion groove 29 so as to be able to guide insertion of the insertion piece 41 and to guarantee smooth movement of the insertion piece 41.

Further, at the inner surface side of the top plate 30 of the cover member 3 opposite to the internal end of the guide recessed portion 33, an engagement recessed portion 36 is formed with which the insertion piece 41 of the erroneous recording prevention member 37 is engaged and adapted to guide movement of the insertion piece 41. The engagement recessed portion 36 includes a supporting portion 35 along the top plate for pressing the insertion portion 41.

Figure 11:
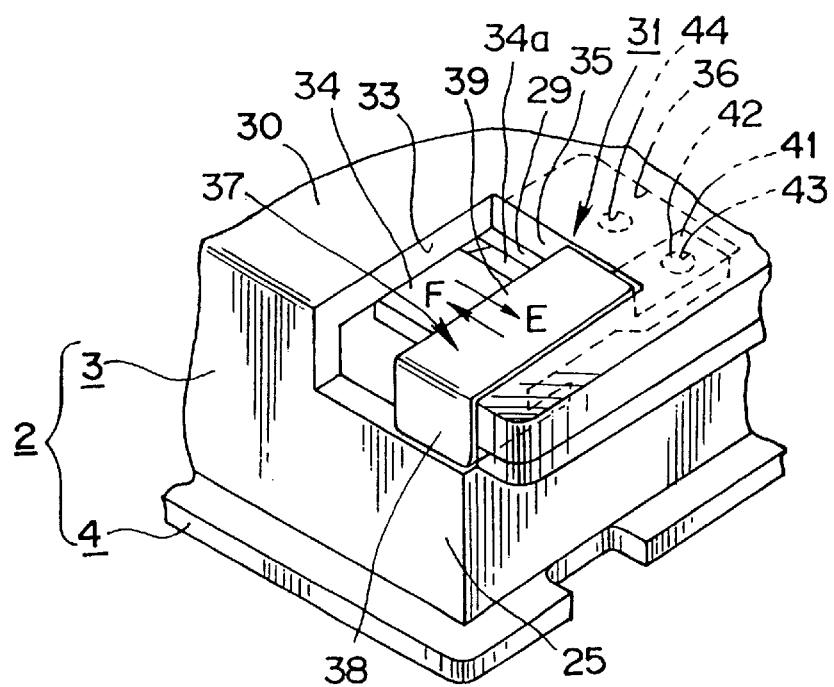
FIG. 11 is a perspective view showing the erroneous recording prevention member moved to its first position.

Further, within the engagement recessed portion 36, first and second holding recessed portions 43, 44 are provided as positioning mechanisms such that when the erroneous recording prevention member 37 disposed within the guide recessed portion 33 is moved to its first position where it closes the erroneous recording detection hole 32, as shown in FIG. 11, and to its second position where it opens the erroneous recording detection hole 32, a holding projection 42 projecting from the insertion piece 41 is engaged with the respective first and second holding recessed portions 43, 44 to secure proper positioning of the erroneous recording prevention member 37 when it is moved to its first and second positions. Alternatively, this position mechanism includes a holding recessed portion provided at the side of the insertion piece 41 of the erroneous recording prevention member 37 with holding projections provided at the side of the engagement recessed portion 36 side.

Meanwhile, the erroneous recording detection hole 32 opened or closed by the erroneous recording prevention member 37 is provided at the front 25 of the cover member 3 positioned within the guide recessed portion 33. This erroneous recording detection hole 32 is provided at the position opposite to the detection element of the erroneous recording detection mechanism disposed at the recording/reproduction unit side when the tape cartridge 1 is loaded into the recording/reproduction unit. In addition, the erroneous recording detection hole 32 allows the detection element of the erroneous recording detection mechanism to be projected toward the interior of the cartridge body 2.

Figure 12:
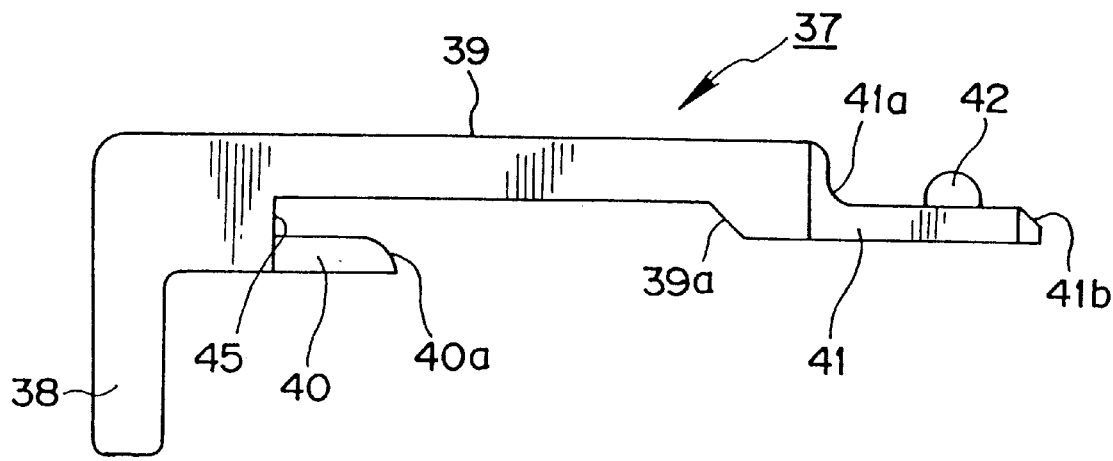
FIG. 12 is a side view showing the erroneous recording prevention member of FIGS. 9–11.
Figure 13:
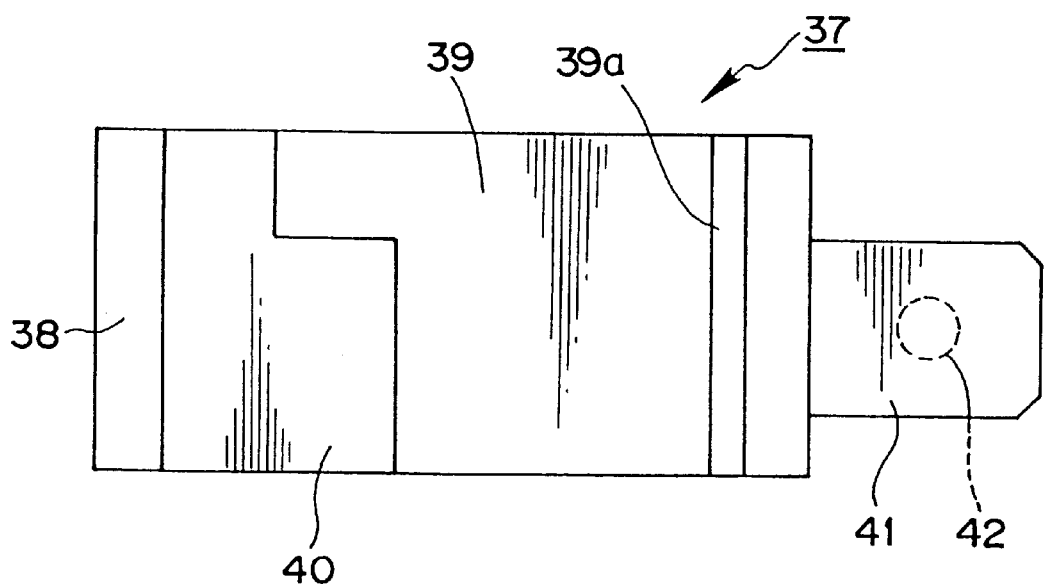
FIG. 13 is a bottom view showing the erroneous recording prevention member of FIG. 12.

Further, the erroneous recording prevention member 37 attached at the cover member 3 positioned within the guide recessed portion 33 includes, at the base end portion side thereof, a portion of a detection member (detected portion when viewed from the recording medium device) 38 for actuating the erroneous recording detection mechanism disposed at the recording/reproduction unit side as shown in FIGS. 12 and 13, and a holding portion 45 for clamping or holding the bottom surface portion 34 of the guide recessed portion 33. This holding portion 45 includes a movement guide piece 39 serving as a movement guide portion projected in a substantially vertical direction from the portion of the detection member 38 and extended toward the top plate 30 side portion of the guide recessed portion 33, and a supporting piece 40 serving as a supporting portion projected from the portion of the detection member 38 substantially parallel to the movement guide piece 39. Namely, as shown in FIG. 12, the holding portion 45 is formed by the movement guide piece 39 and the supporting piece 40 so as to attain a channel shape in cross section, and is formed so as to hold or position the bottom surface portion 34 of the guide recessed portion 33 therebetween.

In this case, the movement guide piece 39 is formed so as to have thickness substantially equal to the depth of the guide recessed portion 33, and is formed in substantially the same plane surface as the upper surface of the top plate 30 of the cover member 3 when the erroneous recording prevention member 37 is attached within the guide recessed portion 33. Moreover, at the inner surface of the front end side of the movement guide piece 39, an inclined guide surface 39a is formed along the inclined surface 34a formed on the bottom surface portion 34 of the guide recessed portion 33. In addition, at the inner surface of the front end side of the movement guide piece 35, chamfering portion 40a is provided for guiding insertion at the time of insertion into the cover member 3 at the front end portion side of the supporting piece 40.

Further, at the front end side of the movement guide piece 39 which forms the holding portion 45 of the erroneous recording prevention member 37, an insertion piece 41 is provided which is inserted into the insertion groove 29 provided at the bottom surface portion 34 of the guide recessed portion 33 toward the inner surface side of the top plate 30 of the cover member 3 when the erroneous recording prevention member 37 is attached to the cover member 3. This insertion piece 41 projects from the lower end side of the front end side of the movement guide piece 39, and an offset portion 41a is formed on the upper surface of the continuously connecting portion side of the movement guide piece 39. This offset portion 41a has a height substantially equal to the thickness of the pressing supporting portion 35 of the cover member 3 side. In addition, at the front end side of the insertion piece 41, a chamfering portion 41b is provided for guiding insertion of the insertion piece 41 into the insertion groove 29.

Moreover, at the upper surface side of the insertion piece 41, a holding projection 42 engaged with the first and second holding recessed portions 43, 44 is formed within the engagement recessed portion 36 provided at the side of the cover member 3. This holding projection 42 is formed of a generally semi-circular shape in cross section having a circumferential circular arc surface for achieving smooth engagement/withdrawal with respect to the first and second holding recessed portions 43, 44.

In order to attach the erroneous recording prevention member 37 to the cover member 3, the movement guide piece 39 faces the portion extended to the top plate 30 side of the guide recessed portion 33 provided at the cover member 3, and to face the supporting piece 40 to the erroneous recording prevention hole 32 to insert the erroneous recording prevention member 37 into the guide recessed portion 33 from the front 25 side of the cover member 3. At this time, the front end portion side of the insertion piece 41 is inserted into the insertion groove 29. When the erroneous recording prevention member 37 is inserted into the guide recessed portion 33, the supporting piece 40 is inserted toward the lower surface side of the bottom surface portion 34 of the guide recessed portion 33 to hold or clamp the bottom surface portion 34 by the supporting piece 40 and the movement guide piece 39 thus to hold the bottom surface portion 34 by the holding portion 45.

When the erroneous recording prevention member 37 is further inserted into the slide recessed portion 33, the insertion piece 41 is inserted toward the interior thereof along the inner surface of the pushing supporting piece 35 by the action of the chamfering portion 41a of the front end portion while the insertion piece 41 is caused to undergo elastic displacement in the thickness direction as shown in FIG. 10. In the condition where the erroneous recording prevention member 37 is securely pushed into the guide recessed portion 33, the insertion piece 41 comes into pressure contact with the inner surface side of the cover member 3 in the state caused to undergo elastic displacement toward the pushing supporting piece 35 side in the direction indicated by arrow C in FIG. 10 so that elastic repulsive force is rendered thereto. Thus, the insertion piece 41 is relatively engaged with the engagement recessed portion 36. At this time, the insertion piece 41 is engaged into the engagement recessed portion 36 and is inserted toward the interior of the cartridge body 2 so that it does not project. Accordingly, there is no possibility that the space where the magnetic tape 12 travels and the space within which the tape reels 13a, 13b are accommodated within the cartridge body 2 may not be narrowed, thus making it possible to maintain the space within the cartridge body 2 to be relatively large.

Moreover, the above-described elastic force of the insertion piece 41 serves to push the inner surface thereof toward the bottom surface portion 34 of the guide recessed portion 33 with respect to the movement guide piece 39 as reactive force. Thus, with respect to the erroneous recording prevention member 37, the holding or clamping state of the bottom surface portion 34 of the guide recessed portion 33 by the movement guide piece 39 and the supporting piece 40 is retained, and they are securely combined or assembled within the guide recessed portion 33 by elastic repulsive force of the insertion piece 41 applied to the pressing supporting piece 35 so that slipping off is prevented. At this time, since elastic repulsive force of the insertion piece 41 is applied in a direction perpendicular to the movement direction of the erroneous recording prevention member 37, there is no possibility that it exerts significant influence on its operability.

Further, with respect to the erroneous recording prevention member 37, in the state where it is attached into the guide recessed portion 33 by the above-described operation, the holding projection 42 provided on the insertion piece 41 is relatively engaged with any one of the first and second holding recessed portions 43, 44 provided within the engagement recessed portion 36 as shown in FIG. 10. The engagement state between the holding projection 42 and the first and second holding recessed portions 43, 44 is securely held by the elastic repulsive force of the insertion portion 41. At this time, the portion of the detection member 38 of the erroneous recording prevention member 37 is opposed to the front 25 of the cover member 3 where the erroneous recording detection hole 32 is formed as shown in FIGS. 9 and 11.

The erroneous recording prevention member 37 attached in a manner positioned within the guide recessed portion 33 provided at the cover member 3 in this way is moved in the direction indicated by arrow E and in the direction indicated by arrow F in FIGS. 6, 9 and 11 along the front portion 2a of the cartridge body 2 in such a manner that the holding portion 45 is guided by the bottom surface portion 34 of the guide recessed portion 33 and the insertion piece 41 is guided by the engagement recessed portion 36. When this erroneous recording prevention member 37 is moved from the first position shown in FIG. 11 to the second position shown in FIG. 9, or from the second position shown in FIG. 9 to the first position shown in FIG. 11, the insertion portion 41 is caused to undergo elastic deformation in the thickness direction. Thus, the holding projection 41 engaged with the first or second holding recessed portion 43 or 44 moves in a manner riding on the bottom surface of the engagement recessed portion 36. When the erroneous recording prevention member 37 is moved to the first or second position, the holding projection 41 is relatively engaged with the first or second holding recessed portion 43 or 44, and is thus held at the first or second position. As a result, the holding projection 41 is securely held at the first or second position.

Meanwhile, in the tape cartridge 1 of this embodiment, when the erroneous recording prevention member 37 is moved to one side of the cartridge body 2 as shown in FIG. 11 so that the portion of the detection member 38 is moved to (located at) the first position where it closes the erroneous recording detection hole 32 provided at the front 25 of the cover member 3, recording of information signals can be made with respect to the magnetic tape 12 accommodated within the cartridge body 2. Moreover, when the erroneous recording prevention member 37 is moved from the first position shown in FIG. 9 toward the internal side of the cartridge body 2 in the direction indicated by arrow F in FIG. 11 so that the portion of the detection member 38 is moved to (located at) the second position where it opens the erroneous recording detection hole 32, the erroneous recording prevention state results where recording of information signals with respect to the magnetic tape 12 accommodated within the cartridge body 2 is not possible.

Namely, in the recording/reproduction unit into which the tape cartridge 1 of this embodiment is loaded, a detection mechanism for detecting the portion of the detection member 38 of the erroneous recording prevention member 37 is provided. This recording/reproduction unit is adapted so that when the portion of the detection member 38 is detected by the detection mechanism, selection of the recording operation mode where recording of information signals can be made with respect to the magnetic tape 12 is permitted. When detection of the portion of detection 38 is not carried out by the detection mechanism, selection of the recording operation mode is not possible.

An example of recording/reproduction unit 50 into which the tape cartridge 1 of this embodiment is loaded will now be described with reference to the attached drawings.

Figure 14:
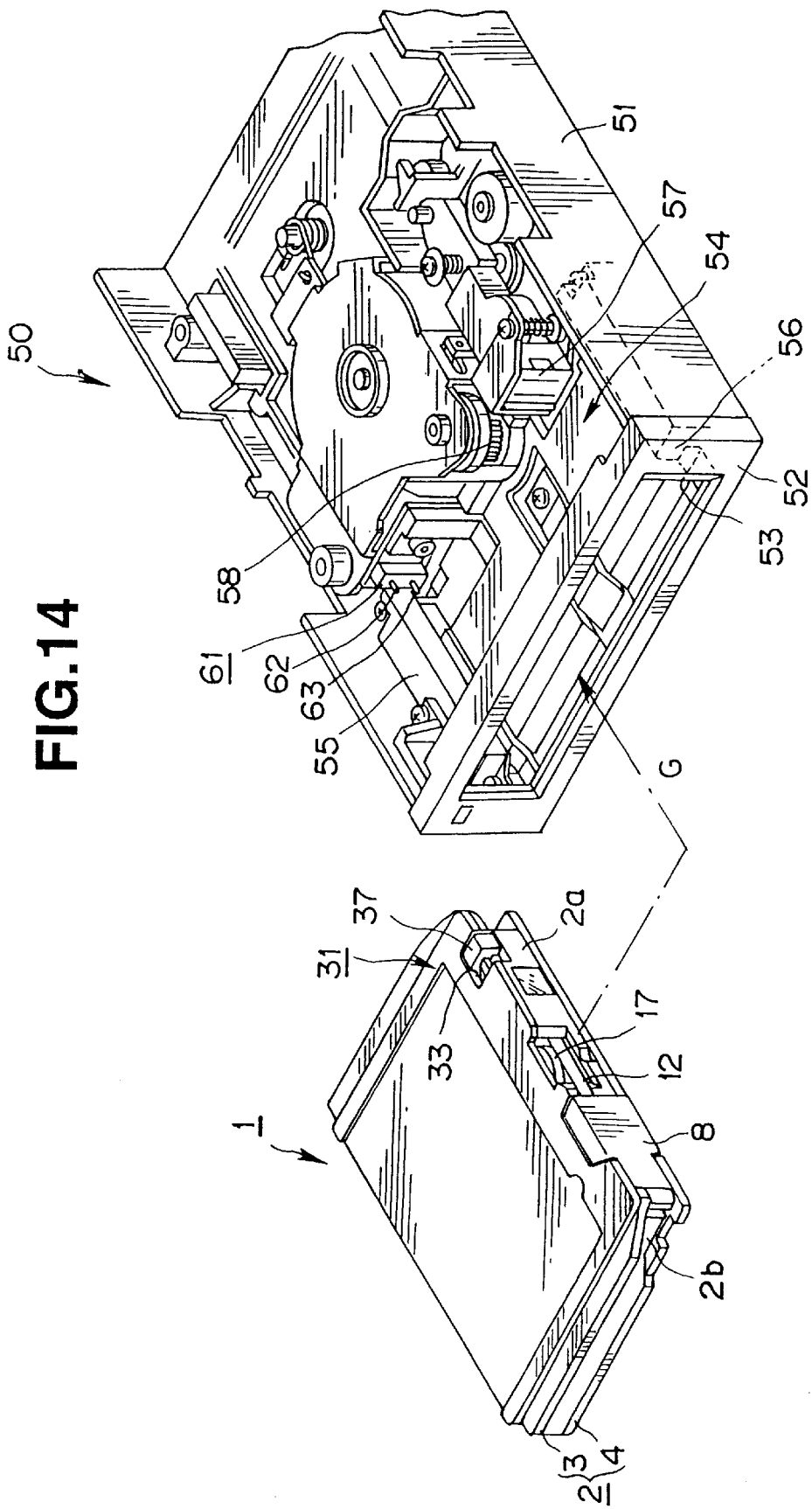
FIG. 14 is a perspective view showing an recording/reproduction unit (apparatus) into which the tape cartridge is loaded.

In this recording/reproduction unit 50, as shown in FIG. 14, a cartridge loading portion 54 is provided into which the tape cartridge 1 of this embodiment is inserted through a cartridge insertion/withdrawal hole 53 provided at a front panel 52 of a unit body 51 to load the tape cartridge 1 within the unit body 51. At both sides of the cartridge loading portion 54, projected portions 56, 55 are provided respectively engaged with engagement grooves 2b, 2c provided at the both sides of the front side of the tape cartridge 1. The tape cartridge 1 is inserted into the unit body 51 through the cartridge insertion/withdrawal hole 53 in the direction indicated by arrow G in FIG. 14 with the front portion 2a side where the erroneous recording prevention member 37 is attached being along the insertion end. At this time, the tape cartridge 1 is inserted in the state where engagement grooves 2b, 2c are respectively engaged with the projected portions 56, 55. When the projected portion 56 is engaged with the engagement groove 2b, the cover body 8 is rotated by the front end of the projected portion 56 against biasing force of the torsion spring 10 to open the opening portion 7 for recording/reproduction.

At the cartridge loading portion 54, positioning projections are provided for proper positioning in the insertion direction of the tape cartridge 1 and pressing supporting means. The tape cartridge 1 is loaded into the cartridge loading portion 54 so that the engagement grooves 2b, 2c are respectively engaged with the projected portions 56, 55, whereby the insertion position is caused to undergo positioning by the positioning projection, and the loading position is caused to undergo positioning by the pressing supporting means.

Moreover, a magnetic head unit 57 and a drive roller 58 are disposed within the unit body 51. When the tape cartridge 1 is loaded into the cartridge loading portion 54, the magnetic head unit 57 is inserted into the opening portion 7 for recording/reproduction to come into slide contact with the magnetic tape 12, and the drive roller 58 is caused to come into pressure contact with the belt drive roller 17 through the driving opening portion 21. In this case, when the drive roller 58 is driven, the belt drive roller 17 of the tape cartridge 1 side is rotationally operated. As a result, the magnetic tape 12 travels at a constant velocity. Thus, recording/reproduction of information signals with respect to the magnetic tape 12 is performed by the magnetic head 57 slidably in contact with the magnetic tape 12.

Figure 15:
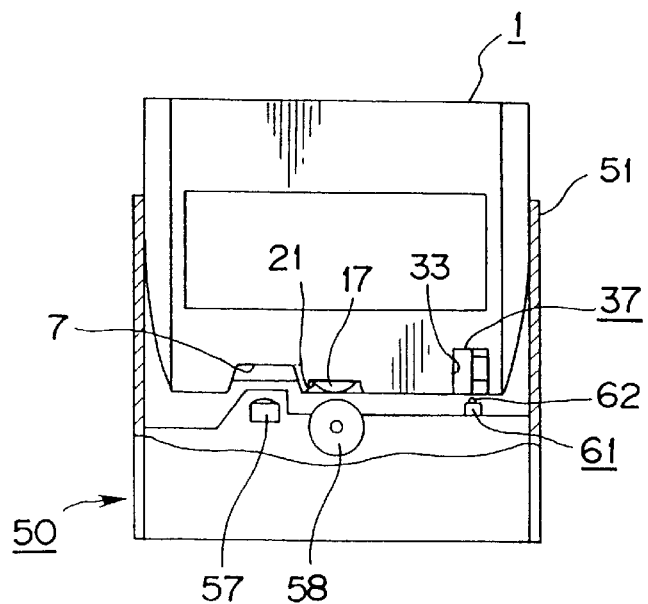
FIG. 15 is a plan view specifically showing the tape cartridge loaded into the recording/reproduction unit, and the erroneous recording prevention member is detected by the detection mechanism of the recording/reproduction unit side.

Meanwhile, in the recording/reproduction unit 50 into which the tape cartridge 1 of this embodiment is loaded, a detection mechanism 61 is provided for detecting loading of the tape cartridge 1 with respect to the cartridge loading portion 54 and for detecting the portion of detection 38 of the erroneous recording prevention member 37 attached to the tape cartridge 1. As shown in FIG. 15, this detection mechanism 61 is provided at the position opposite to the front portion 2a of the tape cartridge 1 loaded with respect to the cartridge loading portion 54 and at the position opposite to the erroneous recording prevention member 37 when the erroneous recording prevention member 37 is located at the first position where it closes the erroneous recording detection hole 32 as shown in FIG. 11.

Figure 16:
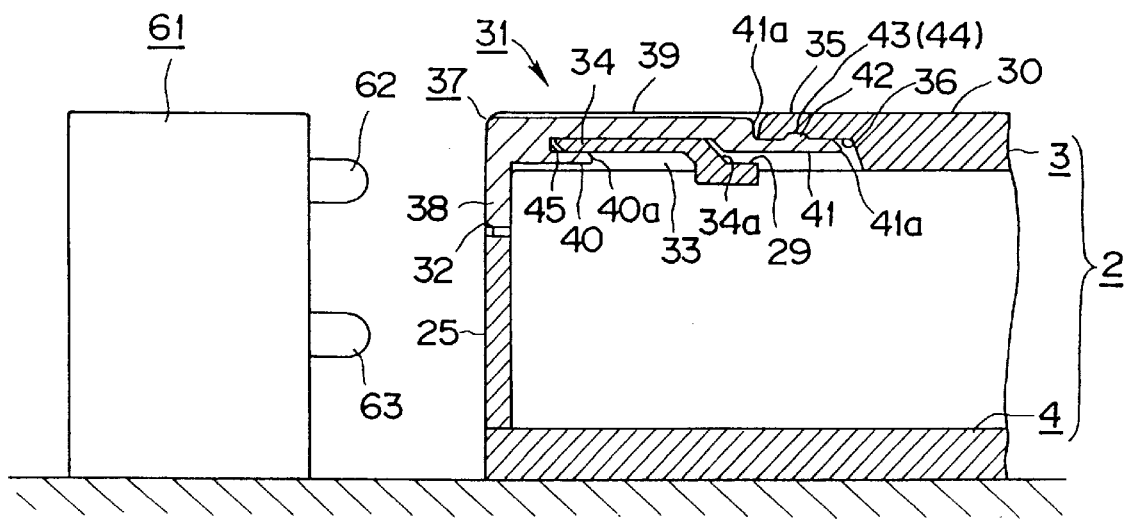
FIG. 16 is a side view showing the tape cartridge and the erroneous recording prevention member attached to the tape cartridge detected by the detection mechanism of the recording/reproduction unit side.

The detection mechanism 61 includes, as shown in FIG. 16, a first detection element 62 for detecting the portion of the detection member 38 of the erroneous recording prevention member 37, and a second detection element 63 for detecting that the tape cartridge 1 is loaded with respect to the cartridge loading portion 54 in parallel in the height direction. Namely, the first detection element 62 is disposed in a manner opposite to the portion of the detection member 38 of the erroneous recording prevention member 37 positioned at the upper surface side of the cartridge body 2, and the second detection element 63 is disposed opposite to the front portion 2a of the cartridge body 2 of the lower side of the erroneous recording prevention member 37.

The detection state of the detection mechanism 61 when the tape cartridge 1 loaded in the cartridge loading portion is moved between its first position, where the erroneous recording prevention member 37 closes the erroneous recording detection hole 32, and its second position where the erroneous recording prevention member 37 opens the erroneous recording detection hole 32 will now be described.

When the tape cartridge 1 loaded in the cartridge loading portion 54 is moved to the first position where the erroneous recording prevention member 37 closes the erroneous recording detection hole 32, the first detection element 62 is pressed by the portion of the detection member 38 of the erroneous recording prevention member 37, and the second detection element 63 is pressed by the front portion 2a of the cartridge body 2. Since the second detection element 63 is pressed, it is detected that the tape cartridge 1 is loaded with respect to the cartridge loading portion 54. As the result of the fact that the first detection element 62 is pressed, it is detected that the erroneous recording prevention member 37 is located at its first position. When the erroneous recording prevention member 37 is detected by the detection mechanism 61, it determines that the tape cartridge 1 is loaded with respect thereto in a condition such that information signals can be recorded onto the magnetic tape 12. When it is detected by the detection mechanism 61 that the tape cartridge 1 is in a recordable state, the recording/reproducing unit 50 is placed in the state where recording operation mode can be selected. By selecting the recording operation mode, recording of information signals is carried out with respect to the magnetic tape 12.

Moreover, when the tape cartridge 1 loaded into the cartridge loading portion 5c is moved to its second position where the erroneous recording prevention member 37 opens the erroneous recording detection hole 32, the second detection element 63 is pressed by the front portion 2a of the cartridge body 2, but the first detection element 62 projects into the erroneous recording detection hole 32 without being pressed by the portion of the detection member 38 of the erroneous recording prevention member 37. In this case, it is detected that the tape cartridge 1 is loaded with respect to the cartridge loading portion 54. However, since there is no possibility that detection of the erroneous recording detection member 37 is carried out, it is determined that the tape cartridge 1 is loaded in a condition where information signals onto the magnetic tape 12 cannot be recorded. When it is detected by the detection mechanism 61 that the tape cartridge 1 is in the recording unable state, selection of the recording operation mode in the recording/reproducing unit 50 is limited. As a result, recording of information signals with respect to the magnetic tape 12 is inhibited. Thus, information signals previously recorded on the magnetic tape 12 are protected.

Alternatively, the erroneous recording prevention hole 32 may be positioned along the front side portion of the cartridge body 2 of the guide recessed portion 33 within which the erroneous recording prevention member 37 is disposed.

In addition, an optical detection mechanism may be used as the detection mechanism 61 provided at the recording/reproduction unit 50 side. Namely, a pair of light emitting and receiving elements may be used to detect light reflected onto the tape cartridge 1 which is emitted from the light receiving element to thereby detect the presence or absence of the erroneous recording prevention member 37 or presence or absence of loading of the tape cartridge 1.

In the above-described tape cartridge 1, the erroneous recording prevention member 37 holds therebetween a portion of the cartridge body 2, i.e., the bottom surface portion 34 of the guide recessed portion 33 by the holding portion 45 of the base end portion side, and the insertion piece 41 provided at the front end side of the holding portion 45 which is in pressure contact with the surface of the internal side of the cartridge body 2. Accordingly, the erroneous recording prevention member 37 is firmly attached to the cartridge body 1. Even if impact is applied to the tape cartridge 1, the erroneous recording prevention means 37 is prevented from being easily moved. Thus, the erroneous recording prevention member 37 is securely held at the first or second position, or is prevented from easily slipping off from the cartridge body 2.

While the above-described tape cartridge is adapted so that the erroneous recording prevention member is moved in parallel to the front portion of the cartridge body to thereby determine a setting where information signals can be recorded and cannot be recorded, a configuration may be employed such that the erroneous recording prevention member is moved in a direction perpendicular to the front portion of the cartridge body, i.e., to the first position where the portion of the detection member of the erroneous recording prevention member is located at the front portion side of the cartridge body and the second position is extended toward the interior of the cartridge body to thereby allow the tape cartridge to be in the information signal recordable state and in the information signal recording unable state.

A tape cartridge including an erroneous recording prevention member which is advanced or withdrawn in a direction perpendicular to the front portion of the cartridge body to determine the information signal recordable state or the information signal recording unable state will now be described as a second embodiment.

It is to be noted that common reference numerals are respectively used with respect to features common to the previously described first embodiment and detailed explanation of these features will be omitted herein, and explanation will be provided below as to certain illustrative features shown in the figures.

Figure 17:
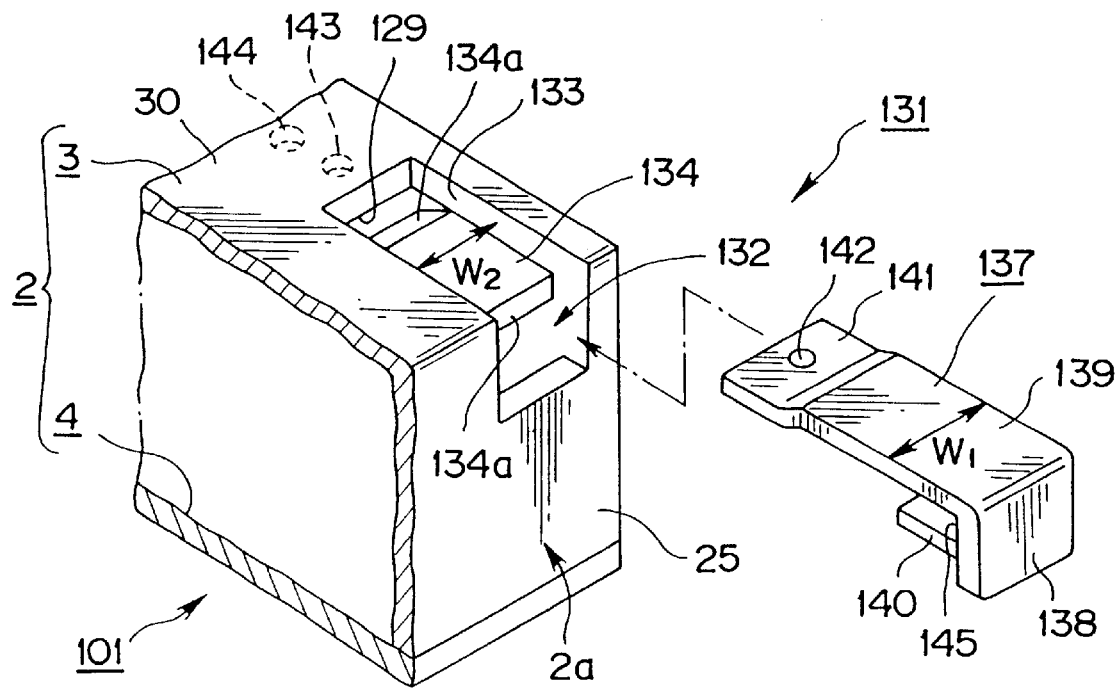
FIG. 17 is an exploded perspective view showing a second preferred embodiment of a tape cartridge in accordance with the teachings of the present invention, wherein the erroneous recording prevention member is attached to the cartridge body.

In the tape cartridge 101 of the second embodiment, similarly to the previously described first embodiment, as shown in FIG. 17, a guide recessed portion 133 is positioned so that an erroneous recording prevention member 137 of an erroneous recording prevention mechanism 131 is provided at cover member 3. This guide recessed portion 133 is formed extending over the front portion 25 of the cover member 3 and top plate 30 of the cover member 3 so as to form a surface opposite to base plate 4 of cartridge body 2.

In this case, as shown in FIG. 17, the guide recessed portion 133 is formed with a width $W_2$ substantially equal to width $W_1$ of the erroneous recording prevention member 137 disposed therewithin. Namely, the guide recessed portion 133 is formed in a manner to linearly guide movement of the erroneous recording prevention member 137.

Thus, a bottom surface portion 134 of the guide recessed portion 133 is held or clamped by the erroneous recording prevention member 137. Since the erroneous recording prevention hole 132 is formed at the front portion 25 of the cover member 3, this bottom surface portion 134 is formed as a plate-shaped portion parallel to the top plate 30 of the cover member 3.

Further, at the internal end side of the portion extending on the top plate 30 of the guide recessed portion 133, an insertion groove 129 is formed into which an insertion piece 141 provided at the erroneous recording prevention member 137 is inserted as described later. This insertion groove 129 is formed in the bottom surface portion 134. An inclined surface 134a faces the insertion groove 129 of the bottom surface portion 134 for guiding insertion of the insertion piece 141.

Figure 18:
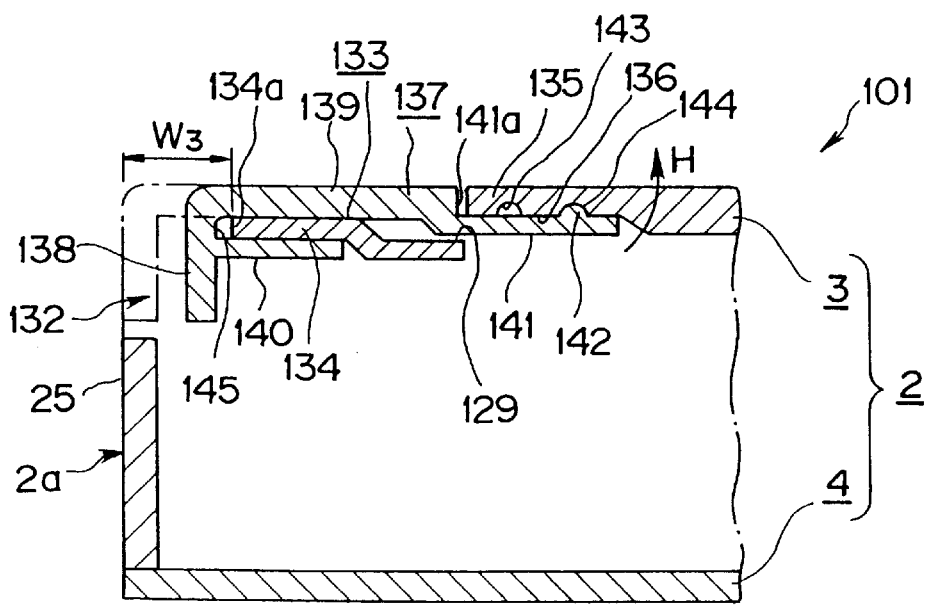
FIG. 18 is a cross sectional view showing the erroneous recording prevention member of FIG. 17 attached to the cartridge body.

Moreover, at the inner surface side of the top plate 30 of the cover member 3 opposite to the internal end of the guide recessed portion 133, as shown in FIG. 18, an engagement recessed portion 136 is formed with which the insertion piece 141 of the erroneous recording prevention member 137 is engaged. The portion where the engagement recessed portion 136 is formed of the top plate 30 serves as a pressing supporting portion 135 of the insertion piece 141.

Figure 19:
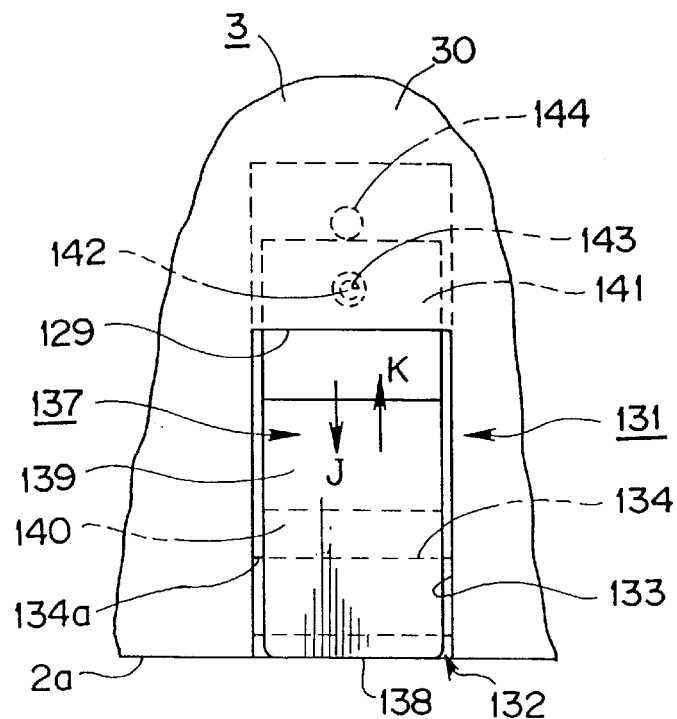
FIG. 19 is a plan view showing the erroneous recording prevention member of FIG. 17 moved to its first position.
Figure 20:
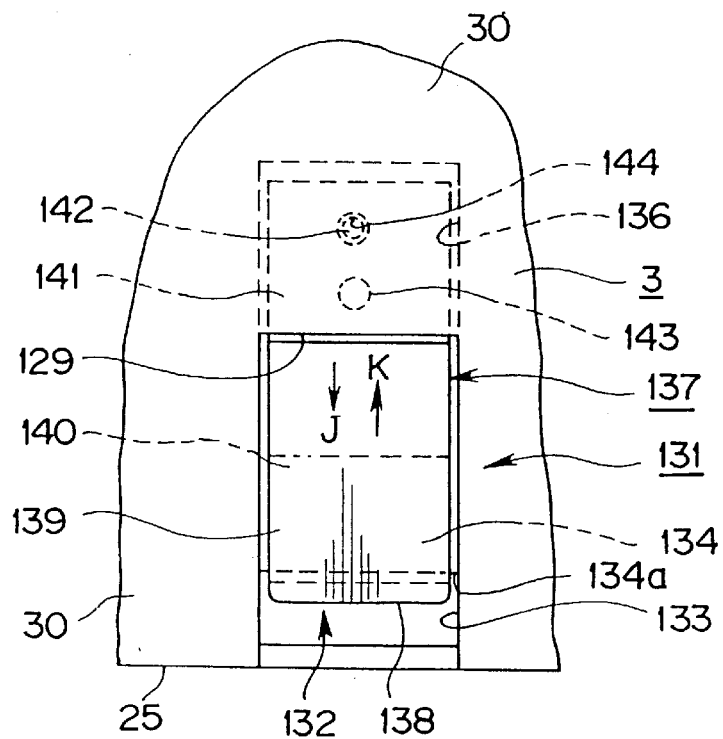
FIG. 20 is a plan view showing the erroneous recording prevention member of FIG. 17 moved to its second position.

Further, at the engagement recessed portion 136, first and second engagement recessed portions 143, 144 are provided forming a positioning mechanism such that when the erroneous recording prevention member 137 disposed at the guide recessed portion 133 is moved to the front portion 2a of the cartridge body 2 as shown in FIG. 19, the erroneous recording prevention member 137 is positioned at its first position where it closes the erroneous recording detection hole 132 and is moved to the internal side of the cartridge body 2 as shown in FIG. 20 at its second position where it opens the erroneous recording detection hole 132, a holding projection 142 projecting from the insertion piece 141 is engaged with the respective first and second holding recessed portions 143, 144 to carry out positioning of the erroneous recording prevention member 137 when moved to the first and second positions of the erroneous recording prevention member 137. In this example, since the erroneous recording prevention member 137 is moved in before and after directions extending from the front portion 2a side of the cartridge body 2 toward the internal side in the direction indicated by arrow K and in the direction indicated by arrow J in FIG. 19, the first and second engagement holding recessed portions 143, 144 are provided in series in the before and after directions of the cartridge body 2.

Also in the second embodiment, the positioning mechanism for carrying out positioning of the erroneous recording prevention member 137 may be such that holding recessed portion is provided at the insertion piece 141 side of the erroneous recording prevention member 137 and holding projections are provided at the side of the engagement recessed portion 136.

Meanwhile, the erroneous recording detection hole 132 opened or closed by the erroneous recording prevention member 137 is provided at the front portion 25 of the cover member 3 when it is positioned within the guide recessed portion 133. Similarly to the previously described first embodiment, this erroneous recording detection hole 132 is provided in such a manner that it is located at the position opposite to the detection element of the erroneous recording detection mechanism disposed at the recording/reproduction apparatus side when the tape cartridge 1 is loaded into the recording/reproduction unit.

The erroneous recording prevention member 137 includes, at the base end portion side thereof, as shown in FIGS. 17 and 18, a portion of a detection member (detected portion when viewed from the recording medium device) 138 for actuating the erroneous recording detection mechanism disposed at the recording/reproduction unit side, wherein a holding portion 145 for holding or clamping the bottom surface portion 134 of the guide recessed portion 133 of the cover member 3 is provided at the base end portion side where the portion of the detection member 138 is provided. This holding portion 145 includes a movement guide piece 139 projecting from the portion of the detection member 138, and extending toward the top plate 30 side portion of the guide recessed portion 133, and a supporting piece 140 serving as a supporting portion projecting from the portion of detection 138 substantially in parallel to the movement guide piece 139. Namely, as shown in FIGS. 17 and 18, the holding portion 145 is formed by the movement guide piece 139 and the supporting piece 140 in a generally channel shape in cross section, and is formed to hold or clamp the bottom surface portion 134 of the guide recessed portion 133.

In this example, the movement guide piece 139 is formed so as to have a thickness substantially equal to the depth of the guide recessed portion 133, and is positioned substantially on the same plane surface as the upper surface of the top plate 30 of the cover member 3 when the erroneous recording prevention member 137 is attached within the guide recessed portion 133.

At the front end side of the movement guide piece 139 constituting the holding portion 145 of the erroneous recording prevention member 137, the insertion piece 141 is provided which is adapted to be inserted into the insertion groove 129 provided at the bottom surface portion 134 of the guide recessed portion 133 and adapted to be inserted toward the inner surface side of the top plate 30 of the cover member 3 when the erroneous recording prevention member 137 is attached to the cover member 3. This insertion piece 141 projects from the lower end side of the front end side of the movement guide piece 139, wherein an offset portion 141 a is formed on the upper surface of continuously connecting portion side of the movement guide piece 139. This offset portion 141a has a height substantially equal to the thickness of the pressing supporting portion 135 of the side of the cover member 3.

Moreover, at the upper surface side of the insertion piece 141, as described above, a holding projection 142 projects therefrom which is engaged with the first and second holding recessed portions 143, 144 formed within the engagement recessed portion 136 provided at the side of the cover member 3. This holding projection 142 is formed so as to have semi-circular shape in cross section having a circumferential circular arc surface to achieve smooth engagement/ withdrawal (disengagement) with respect to the first and second holding recessed portions 143, 144.

In order to attach the erroneous recording prevention member 137 formed as described above to the cover member 3, the movement guide piece 139 is faced to the portion extended toward the top plate 30 side of the guide recessed portion 133 provided at the cover member 3 and the supporting piece 140 is faced to the erroneous recording prevention hole 132 to insert the erroneous recording prevention member 137 into the guide recessed portion 133 from the front portion 25 side of the cover member 3. At this time, the front end portion side of the insertion piece 141 is faced to the insertion groove 129. When the erroneous recording prevention member 137 is inserted into the guide recessed portion 133, the supporting piece 140 is inserted toward the lower surface side of the bottom surface portion 134 of the guide recessed portion 133 to hold or clamp the bottom surface portion 134 by the supporting piece 140 and the movement guide piece 139 thus to hold the bottom surface portion 134 by the holding portion 145.

When the erroneous recording prevention member 137 is further inserted into the slide recessed portion 133, the insertion piece 141 is inserted toward the interior along the inner surface of the pressing supporting piece 135 while undergoing elastic displacement in the thickness direction thereof. In the state where the erroneous recording prevention member 137 is securely pushed into the guide recessed portion 133, the insertion piece 141 comes into pressure contact with the inner surface side of the cover member 3 in the state where it is caused to undergo elastic displacement toward the pressing supporting piece 135 side in the direction indicated by arrow H in FIG. 18 so that elastic repulsive force is rendered thereto, thus to relatively become engaged with the engagement recessed portion 136. At this time, the insertion piece 141 is engaged into the engagement recessed portion 136, and is thus inserted toward the interior of the cartridge body 2 so that it does not project. Accordingly, there is no possibility that the space within which the magnetic tape 12 travels and the space within which the tape reels 13a, 13b are accommodated within the cartridge body 2 may be narrowed.

Moreover, the above-described elastic force of the insertion piece 141 serves to press the internal surface thereof onto the bottom surface portion 134 of the guide recessed portion 133 with respect to the movement guide piece 139 as reactive force. Thus, in the erroneous recording prevention member 137, the holding or clamping state of the bottom surface portion 134 of the guide recessed portion 133 by the movement guide piece 139 and the supporting piece 140 is held, and the erroneous recording prevention member 137 is securely combined with the guide recessed portion 133 therewithin by elastic repulsive force of the insertion piece 141 applied to the pressing supporting piece 135 so that slipping off is prevented. At this time, the elastic repulsive force of the insertion piece 141 is applied in a direction perpendicular to the movement direction of the erroneous recording prevention member 137. For this reason, any unfavorable phenomenon exerting a bad influence on the operability is also prevented.

In the state where the erroneous recording prevention member 137 is attached within the guide recessed portion 133 by the above-described operation, the engagement projection 142 provided on the insertion piece 141 is relatively engaged with any one of the first and second holding recessed portions 143, 144 provided within the engagement recessed portion 136 as shown in FIGS. 19 and 20. The engagement state between the holding projection 142 and the first and second holding recessed portions 143, 144 is securely held by elastic repulsive force of the insertion piece 141. At this time, the portion of the detection member 138 of the erroneous recording prevention member 137 is opposed to the erroneous recording prevention hole 132 formed at the front portion 25 of the cover member 3.

The erroneous recording prevention member 137 positioned within the guide recessed portion 133 is moved in the direction indicated by arrow J and in the direction indicated by arrow K in FIGS. 19 and 20 within the range between a first position where the erroneous recording prevention member 137 is moved to the front portion 2a of the cartridge body 2, at which the portion of the detection member 138 is caused to be flush with the front of the cover member 3 to close the erroneous recording prevention hole 132 as shown in FIG. 19 and a second position where the portion of the detection member 138 is moved toward the internal side of the cartridge body 2 to open the erroneous recording prevention hole 132 as shown in FIG. 20 while the holding portion 145 is guided by the bottom surface portion 134 of the guide recessed portion 133 and the insertion piece 141 is guided by the engagement recessed portion 136. This erroneous recording prevention member 137 is adapted so that when it is moved from the first position shown in FIG. 19 to the second position shown in FIG. 20, or from the second position shown in FIG. 20 to the first position shown in FIG. 19, the insertion portion 141 is caused to undergo elastic displacement in the thickness direction thereof, and the holding projection 141 engaged with the first or second holding recessed portions 143 or 144 is moved riding on the bottom surface of the engagement recessed portion 136. When the erroneous recording prevention member 137 is moved to its first or second positions, the holding projection 141 is relatively engaged with the first or second holding recessed portions 143 or 144 so that it is held at the first or second position. Thus, the erroneous recording prevention member 137 is securely held at the first or second positions.

Meanwhile, in the case of the tape cartridge 101 of this embodiment, since the erroneous recording prevention member 137 is moved in a manner ranging from the front portion 2a side of the cartridge body 2 toward the internal side thereof, a cut portion 134b of a width $W_3$ for permitting the movement of the erroneous recording prevention member 137 is provided, as shown in FIG. 18, at the front side of the bottom surface portion 134 of the guide recessed portion 133.

Further, in the tape cartridge 101 of this embodiment, when the portion of the detection member 138 of the erroneous recording prevention member 137 is moved, as shown in FIG. 19, to the first position where it becomes flush with the front portion 2a of the cartridge body 2 so that it is located at its first position where it closes the erroneous recording detection hole 132, recording of information signals can be made with respect to the magnetic tape 12 accommodated within the cartridge body 2. Moreover, when the erroneous recording prevention member 137 is moved from the first position shown in FIG. 19 toward the internal side of the cartridge body 2 in the direction indicated by arrow K in FIGS. 19 and 20 so that it is located at its second position where the portion of detection member 138 opens the erroneous recording detection hole 132, an erroneous recording prevention state results where recording of information signals with respect to the magnetic tape 12 accommodated within the cartridge body 2 is not permitted to be performed.

Namely, also in the case of the tape cartridge 101 of this embodiment, similarly to the previously described tape cartridge 1, when the portion of the detection member 138 is detected by the detection mechanism of the recording/reproduction unit side into which this tape cartridge 101 is loaded, selection of the recording operation mode for permitting recording of information signals with respect to the magnetic tape 12 can be made. When the portion of the detection member 138 is not determined by the detection mechanism, selection of the recording operation mode is not permitted to be carried out.

While the above-described tape cartridges of the first and second embodiments are adapted so that the erroneous recording prevention member is linearly moved with respect to the cartridge body to thereby set the tape cartridge so that it is in the information signal recordable state and the information signal recording unable state, a configuration may be employed such that the erroneous recording prevention member is rotated with respect to the cartridge body, whereby the erroneous recording prevention member is moved to a first position where the portion of the detection member thereof is detected by the detection mechanism of the recording/reproduction unit side and a second position where it is not detected by the detection mechanism.

An erroneous recording prevention member which is rotated with respect to the cartridge body to set the tape cartridge so that it is in the information signal recordable state or the information signal recording unable state will now be described as a third embodiment.

It is to be noted that common reference numerals are respectively used with respect to features common to the previously described first embodiment and detailed explanation of these features will be omitted, and explanation will be provided below only as to certain illustrative features shown in the figures.

Figure 21:
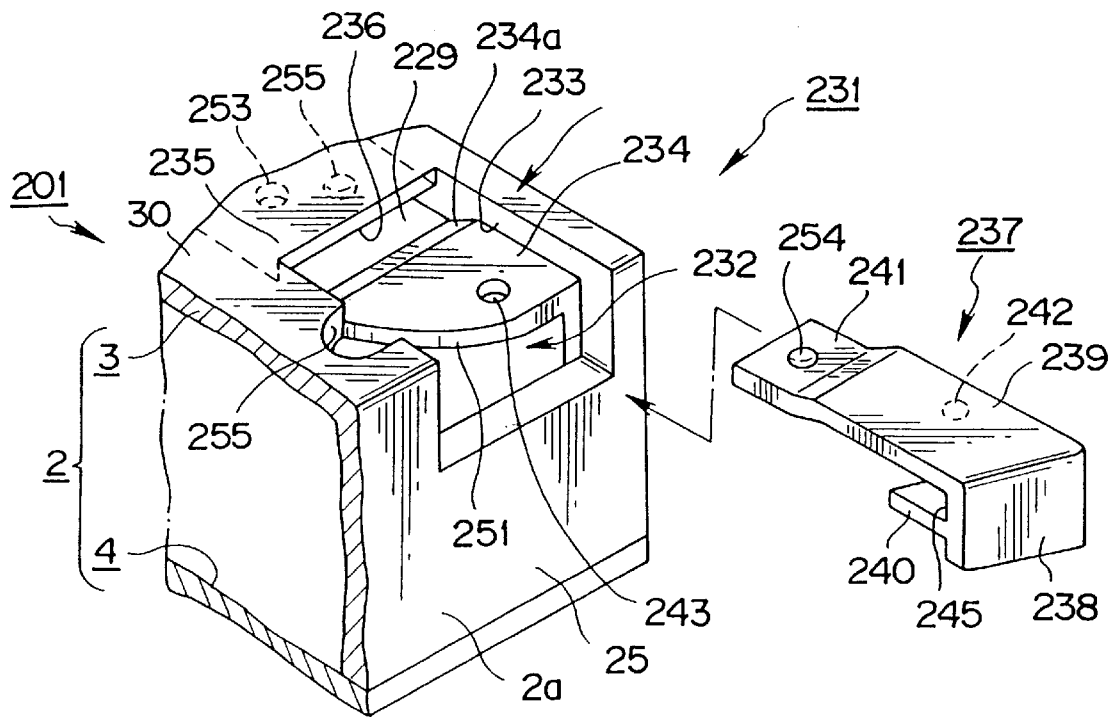
FIG. 21 is an exploded perspective view showing a third preferred embodiment of a tape cartridge in accordance with the teachings of the present invention, wherein the erroneous recording prevention member is attached to the cartridge body.
Figure 23:
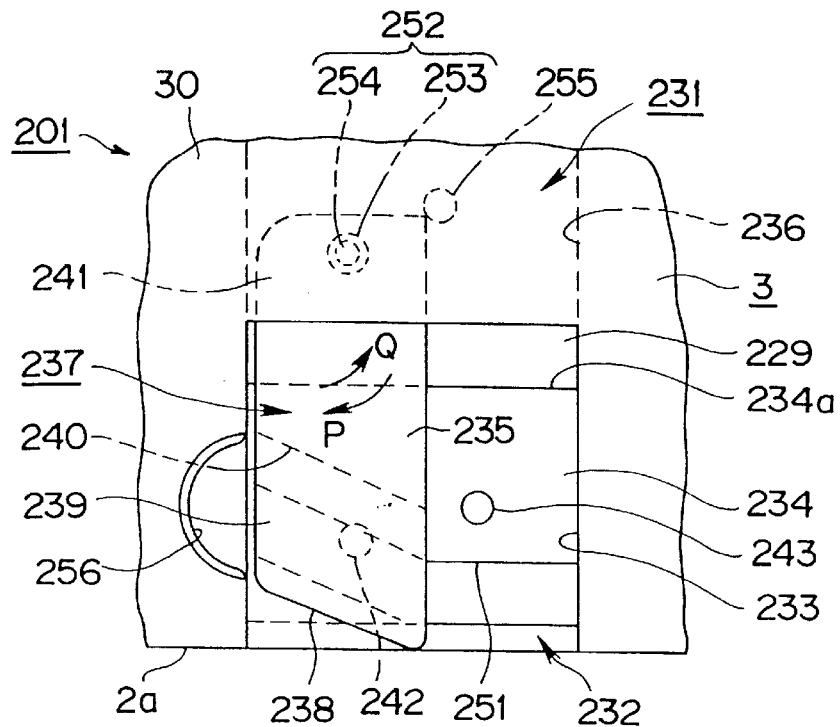
FIG. 23 is a plan view showing the erroneous recording prevention member of FIG. 21 attached to the cartridge body, and moved to its second position.
Figure 24:
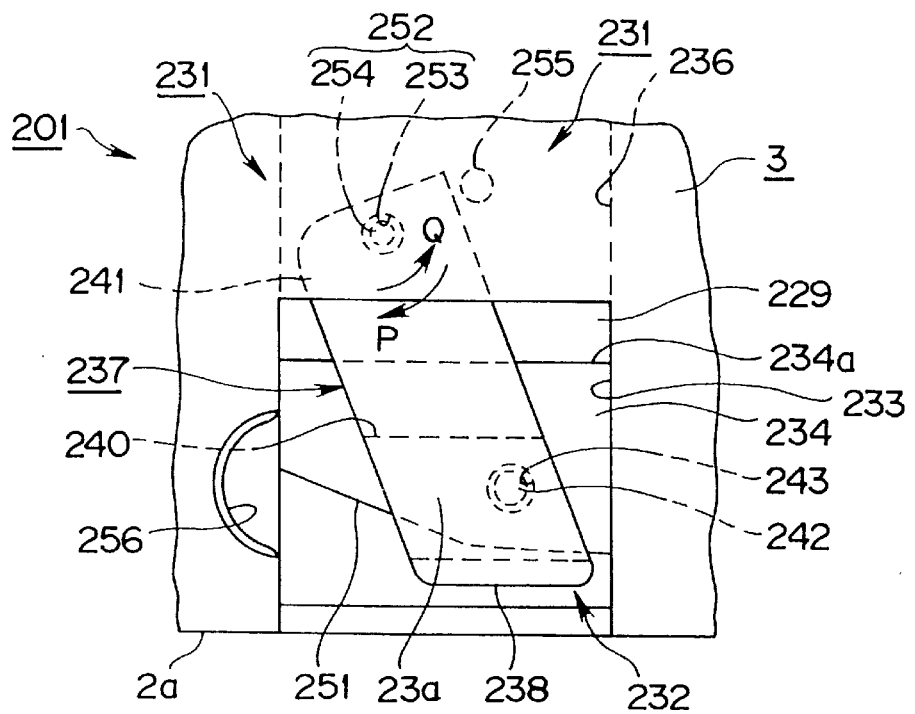
FIG. 24 is a plan view showing the erroneous recording prevention member rotated within guide recessed portion so that it is moved to its first position.

In the tape cartridge 201 of the third embodiment, similarly to the previously described first embodiment, as shown in FIG. 21, a guide recessed portion 233 is provided at cover member 3 where an erroneous recording prevention member 237 including an erroneous recording prevention mechanism 231 is disposed. This guide recessed portion 233 is formed extending over a front portion 25 of the cover member 3 and a top plate 30 of the cover member 3 forming a surface opposite to base plate 4 of cartridge body 2. In this case, the guide recessed portion 233 is sized for permitting rotation of the erroneous recording prevention member 237 disposed therewithin as shown in FIGS. 21, 23 and 24.

Further, a bottom surface portion 234 of the guide recessed portion 233 serves as the portion held or clamped by the erroneous recording prevention member 237. An erroneous recording prevention hole 232 is formed at the front portion 25 of cover member 3, whereby this bottom surface portion 234 is formed as a plate-shaped portion in parallel to the top plate 30 of the cover member 3. At the front end portion side facing the front portion 2a of the cartridge body 2 of the bottom surface portion 234, a rotational guide portion 251 is formed which has a slightly curved inclined surface so as to permit rotation of the erroneous recording prevention member 237.

Further, at the internal end side of the portion extending on the top plate 30 of the guide recessed portion 233, an insertion groove 229 is formed into which an insertion piece 241 provided at the erroneous recording prevention member 237 is inserted as described later. This insertion groove 229 is formed in the bottom surface portion 234. The plane surface facing in the insertion groove 229 of the bottom surface portion 234 is an inclined surface 234a for guiding insertion of the insertion piece 241.

Figure 22:
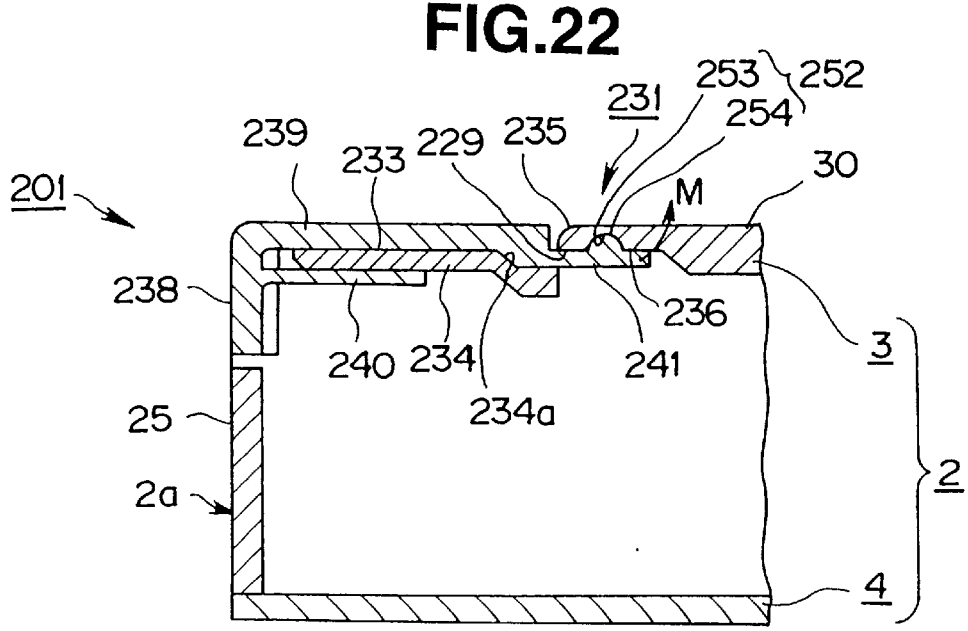
FIG. 22 is a cross sectional view showing the erroneous recording prevention member of FIG. 21 attached to the cartridge body.

At the internal surface side of the top plate 30 of the cover member 3 opposite to the internal end of the guide recessed portion 233, an engagement recessed portion 236 with which the insertion piece 241 of the erroneous recording prevention member 237 is engaged is formed as shown in FIG. 22. The portion where the engagement recessed portion 236 is formed of the top plate 30 serves as a pressing supporting portion 235 of the insertion piece 241.

In addition, within the engagement recessed portion 236, an engagement hole 253 is provided which provides a rotational fulcrum portion 252 for rotatably supporting the erroneous recording prevention member 237 so that the erroneous recording prevention member 237 disposed within the guide recessed portion 233 is rotated in such a manner that it is located at a first position where it is moved toward the side of the cartridge body 2 shown in FIG. 24 so that it closes the portion to which the detection element of the detection mechanism of the recording/reproduction unit side is opposed to the erroneous recording hole 232, and a second position, where the erroneous recording prevention member 237 is rotated (moved) toward the central portion side of the front portion 2a of the cartridge body 2 as shown in FIG. 23 to open the portion to which the detection element of the detection mechanism of the recording/reproduction unit side is opposed to the erroneous recording detection hole 232. An engagement projection 254 projected on the insertion piece 241 of the erroneous recording prevention member 237 is engaged with the engagement hole 253 to thereby provide the rotational fulcrum portion 252.

Alternatively, the engagement hole 253 and the engagement projection 254 providing the rotational fulcrum portion 252 may be provided so as to have the relationship opposite to the above. Namely, a configuration can be employed in which the engagement hole 253 is provided at the insertion piece 241 side of the erroneous recording prevention member 237 and the engagement projection 254 is provided at the engagement recessed portion 236 side.

Further, within the engagement recessed portion 236, a rotation limiting projection 255 projects such that when the erroneous recording prevention member 237 is rotated about the rotational fulcrum portion 252, the rotation limiting projection 255 limits the rotational locus of the erroneous recording prevention member 237 to prevent the erroneous recording prevention member 237 from slipping off from the rotational fulcrum portion 252.

Moreover, at the bottom surface portion 234 of the guide recessed portion 233, a holding recessed portion 243 is provided such that when the erroneous recording prevention member 237 is rotated so that it is placed at its second position shown in FIG. 24, a holding projection 242 provided on a rotational guide piece 239 forming a holding portion 245 of the erroneous recording prevention member 237 is held within the holding recessed portion 243. The holding projection 242 and the holding recessed portion 243 constitute a positioning mechanism for positioning the rotational position of the erroneous recording prevention member 237.

Furthermore, at one side of the guide recessed portion 236 therewithin, as shown in FIG. 21, a jig insertion groove 256 is formed into which a jig for allowing the erroneous recording prevention member 237 to undergo rotational operation is inserted.

Further, the erroneous recording prevention member 237 attached to the cover member 3 constituting the cartridge body 2 in the state positioned within the guide recessed portion 233 includes, at the base end portion side thereof, as shown in FIGS. 21 and 22, a portion of a detection member (detected portion when viewed from the recording medium device) 238 for actuating the erroneous recording detection mechanism disposed at the recording/reproduction unit side, wherein the holding portion 245 for holding or clamping the bottom surface portion 234 of the guide recessed portion 233 is provided at the base end portion side where the portion of the detection member 238 is provided. This holding portion 245 is formed by a rotational guide piece 239 which is the rotational guide portion extended toward the top plate 30 side portion of the guide recessed portion 233, and a supporting piece 240 serving as a supporting portion projected from the portion of the detection member 238 substantially in parallel in a manner opposite to the rotational guide piece 239. Namely, as shown in FIGS. 21 and 22, the holding portion 245 is formed by the rotational guide piece 239 and the supporting piece 240 so as to be generally channel shaped in cross section, and is formed so as to hold or clamp the bottom surface portion 234 of the guide recessed portion 233.

Additionally, the portion of the detection member 238 provided at the erroneous recording prevention member 237 of this embodiment is positioned, as shown in FIGS. 21, 23 and 24, in a manner inclined with respect to the holding portion 245 slightly curved corresponding to the rotational locus of the erroneous recording prevention member 237.

In this case, the rotational guide piece 239 is formed so as to have a thickness substantially equal to the depth of the guide recessed portion 233, and is adapted so that when the erroneous recording prevention member 237 is attached within the guide recessed portion 233, the rotational guide piece 239 is formed substantially on the same plane as the upper surface of the top plate 30 of the cover member 3.

Further, at the front end side of the rotational guide piece 239 forming the holding portion 245 of the erroneous recording prevention member 237, the insertion piece 241 is provided such that when the erroneous recording prevention member 237 is attached to the cover member 3, the insertion piece 241 is inserted into the insertion groove 229 provided at the bottom surface portion 234 of the guide recessed portion 233 and is inserted toward the internal surface side of the top plate 30 of the cover member 3. This insertion piece 241 projects from the lower end side of the front end side of the movement guide piece 239, and an offset portion 241 a is formed on the upper surface of the continuously connecting portion side of the rotational guide piece 239. This offset portion 241a has a height substantially equal to the thickness of the pressing supporting portion 235 of the cover member 3 side.

Moreover, at the upper surface side of the insertion piece 241, as described above, the engagement projection 254 of the rotational fulcrum portion 252 is provided.

In order to attach the erroneous recording prevention member 237 as described above to the cover member 3, the rotational guide piece 239 is faced toward the portion extended toward the top plate 30 side of the guide recessed portion 233 provided at the cover member 3 and the supporting piece 240 is faced toward the erroneous recording prevention hole 232 to insert the erroneous recording prevention member 237 into the guide recessed portion 233 from the front portion 25 side of the cover member 3. At this time, the front end portion side of the insertion piece 241 is faced to the insertion groove 229. When the erroneous recording prevention member 237 is inserted into the guide recessed portion 233, the supporting piece 240 is inserted toward the lower surface side of the bottom surface portion 234 of the guide recessed portion 233 to hold or clamp the bottom surface portion 234 by the supporting piece 240 and the rotational guide piece 239 thus to hold the bottom surface portion 234 by the holding portion 245.

When the erroneous recording prevention member 237 is further inserted into the slide recessed portion 233, the insertion piece 241 is inserted toward the interior along the inner surface of the pressing supporting piece 235 while the insertion piece 241 undergoes elastic displacement in the thickness direction thereof. In the state where the erroneous recording prevention member 237 is securely pushed into the guide recessed portion 233, the insertion piece 241 comes into pressure contact with the inner surface side of the cover member 3 and undergoes elastic displacement toward the pressing supporting piece 235 side in the direction indicated by arrow M in FIG. 22 so that elastic repulsive force is rendered thereto, and is thus relatively engaged with the engagement recessed portion 236.

In this case, the above-mentioned elastic repulsive force of the insertion piece 241 is applied so as to press the internal surface thereof onto the bottom surface portion 234 of the guide recessed portion 233 with respect to the movement guide piece 239 as reactive force. Thus, in the erroneous recording prevention member 237, the bottom surface portion 234 of the guide recessed portion 233 is held by the rotational guide piece 239 and the supporting piece 240, and the erroneous recording prevention member 237 is securely combined with the guide recessed portion 233 therewithin by elastic repulsive force of the insertion piece 241 applied to the pressing supporting piece 235. Thus, slipping off is prevented.

When the insertion piece 214 is caused to be engaged with the engagement recessed portion 236 as described above, the engagement projection 254 provided on the insertion piece 214 is engaged with the engagement hole 253 of the engagement recessed portion 236 side as shown in FIG. 22. Then, the erroneous recording prevention member 237 is attached to the cartridge body 2 so that it can be rotated in the direction indicated by arrow P and in the direction indicated by arrow Q in FIGS. 23 and 24, with the engagement projection 254 engaged with the engagement hole 253 acting as the rotational fulcrum, within the guide recessed portion 233. Thus, the erroneous recording prevention member 237 is rotated in the direction indicated by arrow P and in the direction indicated by arrow Q in FIGS. 23 and 24 with the rotational fulcrum portion 252 being the pivot center within the range between the first position where the erroneous recording prevention hole 232 is closed by the portion of the detection member 238 as shown in FIG. 24 and the second position where the portion of the detection member 238 opens the erroneous recording prevention hole 232 as shown in FIG. 23 while the holding portion 245 is guided by the bottom surface portion 234 of the guide recessed portion 233 and the insertion piece 241 is guided by the engagement recessed portion 236. When the erroneous recording prevention member 237 is rotated so that it is placed at the first position shown in FIG. 24, the holding projection 242 is engaged with the holding recessed portion 243 to limit rotation, whereby the portion of the detection member 238 closes the erroneous recording detection hole 232 thus to securely maintain movement of the erroneous recording prevention member 237 to the first position where recording of information signals can be made with respect to the magnetic tape 12.

Namely, the tape cartridge 201 of this embodiment is such that when the portion of the detection member 238 of the erroneous recording prevention member 237 is rotated so that it is positioned at one side of the cartridge body 2 as shown in FIG. 24, whereby it is located at the first position where it closes the erroneous recording detection hole 232, recording of information signals can be made with respect to the magnetic tape 12 accommodated within the cartridge body 2. Moreover, when the erroneous recording prevention member 237 is rotated in the direction indicated by arrow P in FIG. 24 from the first position shown in FIG. 24 so that the portion of the detection member 238 is moved to the second position as shown in FIG. 23 where the portion of the detection member 238 opens the erroneous recording detection hole 232, recording of information signals with respect to the magnetic tape 12 accommodated within the cartridge body 2 is not permitted to be performed.

Namely, also in the tape cartridge 201 of this embodiment, similarly to the previously described respective tape cartridges 1, 101, when the portion of the detection member 238 is detected by the detection mechanism of the recording/reproduction unit side into which the tape cartridge 201 is loaded, selection of the recording operation mode for permitting recording of information signals with respect to the magnetic tape 12 can be made. When the portion of the detection member 238 is not performed by the detection mechanism, selection of the recording operation mode is not permitted to be performed.

Since the above-described tape cartridge 201 of the third embodiment is designed so that the erroneous recording prevention member 237 is only rotated within the range between the first and second positions with the rotational fulcrum portion 252 being the pivot center, there is the possibility that when the erroneous recording prevention member 237 is attached so that it does not protrude from the cartridge body 2 and is moved to the first position shown in FIG. 24 where it is obliquely rotated with respect to the cartridge body 2, the portion of the detection member 238 may be positioned inwardly of the cartridge body 2, thus failing to precisely detect the portion of detection 238 by the detection mechanism of the recording/reproduction unit.

In view of the above, it is desirable that where the erroneous recording prevention member 237 is rotatably attached to the cartridge body 2, it is advanced or withdrawn in before and after directions of the cartridge body 2 along with its consequent rotation.

A tape cartridge 303 of a fourth preferred embodiment adapted so that the erroneous recording prevention member 237 can be rotated and is advanced and withdrawn with respect to the cartridge body 2 as stated above will be described. Since features except for the rotational fulcrum portion are common to those of the third embodiment in this tape cartridge 303, reference numerals of common features for the third and fourth preferred embodiments are the same and detailed explanation will therefore be omitted.

Figure 25:
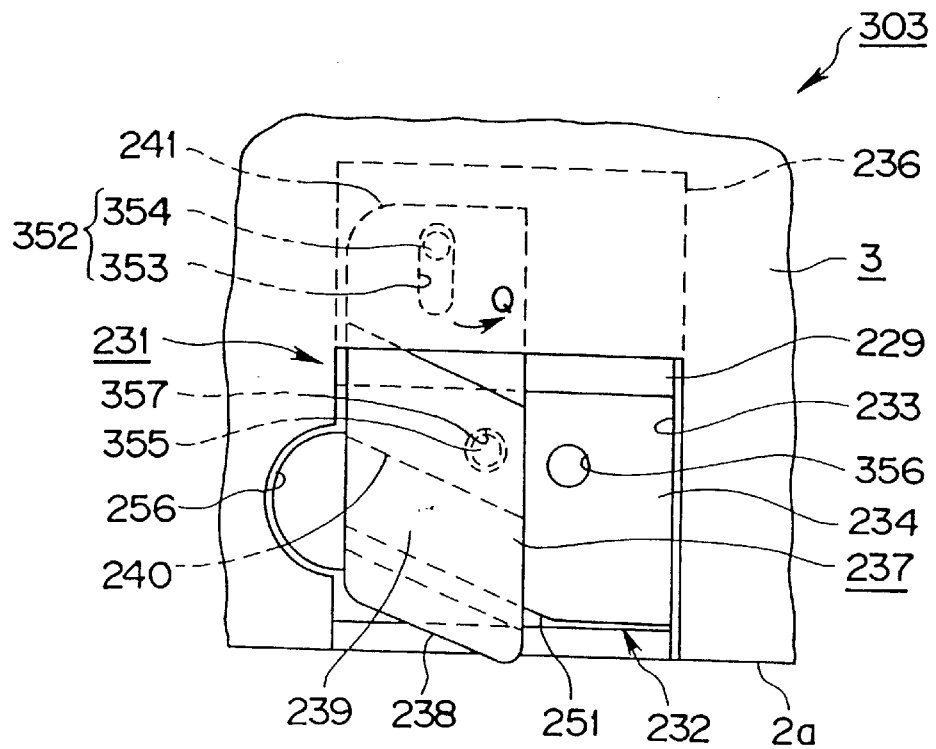
FIG. 25 is a plan view showing a fourth preferred embodiment of a tape cartridge in accordance with the teachings of the present invention, wherein the erroneous recording prevention member is attached to the cartridge body, and is moved to its second position.
Figure 26:
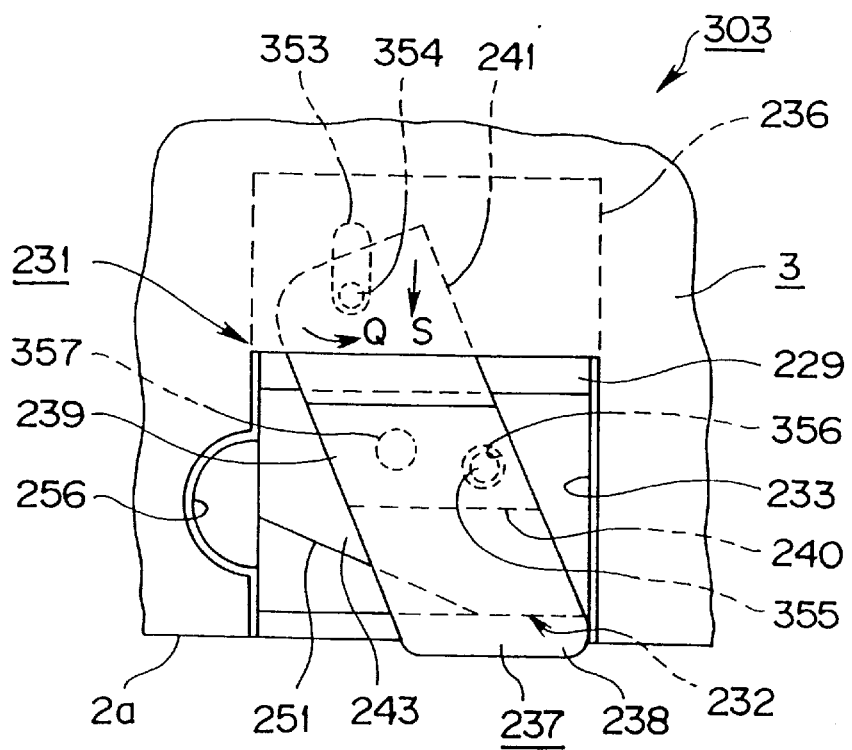
FIG. 26 is a plan view showing the erroneous recording prevention member of FIG. 25 rotated within guide recessed portion so that it is moved to its first position.

In the tape cartridge 303 of the fourth embodiment, an engagement hole 353 with which an engagement projection 354 provided at the erroneous recording prevention member 237 side forming a rotational fulcrum portion 352 for rotatably supporting the erroneous recording prevention member 237 with respect to the cartridge body 2 is formed by an elongated hole in which the length direction is caused to be before and after directions of the cartridge body 2 as shown in FIGS. 25 and 26. By placing the engagement hole 353 by the elongated hole as aforedescribed, when the erroneous recording prevention member 237 is rotated from the second position where it opens the erroneous recording detection hole 232 as shown in FIG. 25 to not permit recording of information signals with respect to the tape cartridge 303 in the direction indicated by arrow Q in FIGS. 25 and 26 of the first position direction where the erroneous recording detection hole 232 shown in FIG. 26 is closed to permit recording of information signals with respect to the tape cartridge 303 shown in FIG. 26, the erroneous recording prevention member 237 may be moved toward the front portion 2a side of the cartridge body 2 in the direction indicated by arrow S in FIG. 26. As a result, when the erroneous recording prevention member 237 is rotated so that it is placed at the first position as shown in FIG. 26, the erroneous recording detection portion 238 is permitted to be substantially flush with the front portion 2a of the cartridge body 2. Thus, the portion of the detection member 238 can be precisely detected by the detection mechanism of the recording/reproduction unit side.

In the tape cartridge 303 of the fourth embodiment, a holding mechanism is provided such that when the erroneous recording prevention member 237 is moved to the first position and the second position, it holds the erroneous recording prevention member 237. Similarly to the previously described respective embodiments, this holding mechanism includes a holding projection 355 which is provided on the inner surface of rotational guide piece 239 of the erroneous recording prevention member 237, and holding recessed portions 356, 357 where the holding projection 355 is held are provided on bottom surface portion 234 of guide recessed portion 233 within which the rotational guide piece 239 is rotated.

While, in the above-described tape cartridges of the respective embodiments, the erroneous recording prevention member is formed in such a manner that it is attached in the state inserted from the front portion side of the cartridge body, the erroneous recording prevention member may be attached from the principal surface side of the cartridge body.

The fifth preferred embodiment in which the erroneous recording prevention member is attached from the principal surface side of the cartridge body will be described with reference to the attached drawings.

It is to be noted that reference numerals are the same for the features common to those of the previously described first embodiment and detailed explanation thereof is omitted, and only certain illustrative features will be described.

Figure 27:
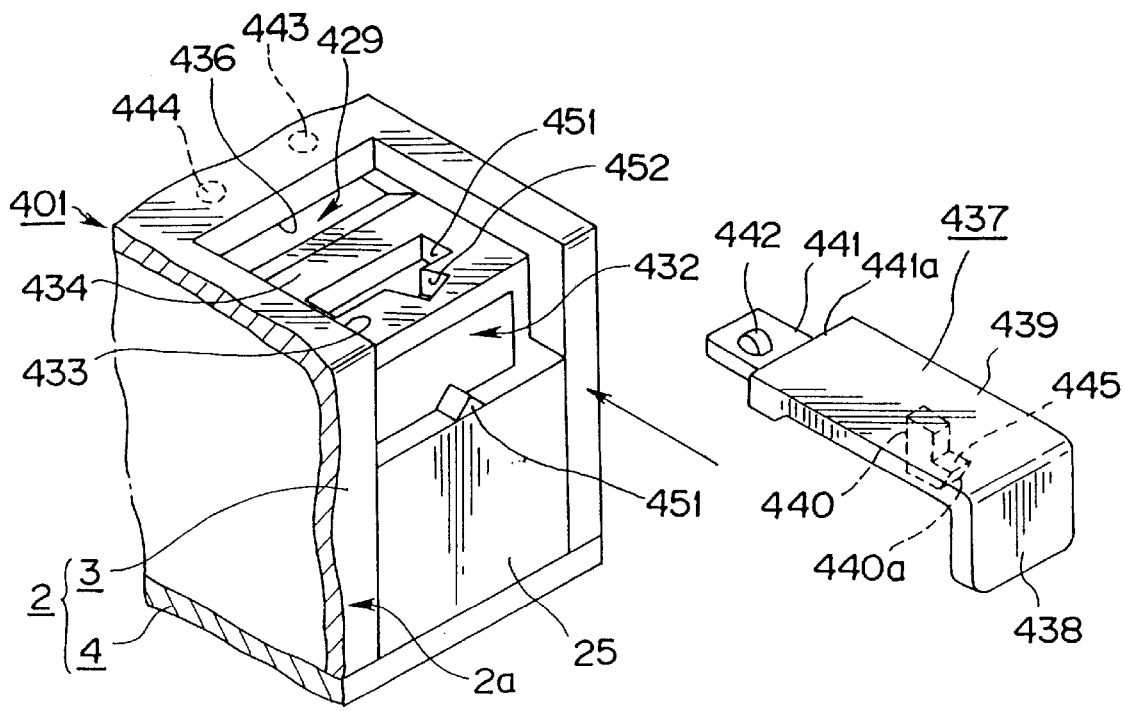
FIG. 27 is an exploded perspective view showing a fifth preferred embodiment of a tape cartridge in accordance with the teachings of the present invention, wherein the erroneous recording prevention member is attached to the cartridge body.

In the tape cartridge 401 of the fifth embodiment, similar to the previously described first embodiment, at the portion where an erroneous recording prevention member 437 is disposed of cover member 3, as shown in FIG. 27, a guide recessed portion 433 within which the erroneous recording prevention member 437 is moved and an erroneous recording detection hole 432 opened or closed by the erroneous recording prevention member 437 are provided.

The guide recessed portion 433 within which the erroneous recording prevention member 437 is disposed is formed extending over the front portion 25 of the cover member 3 which is formed on the front portion 2a of cartridge body 2 and top plate 30 of the cover member 3 opposite to the base plate 4 of the cartridge body 2. A bottom surface portion 434 of the guide recessed portion 433 serves as the portion held or clamped by the erroneous recording prevention member 437. This bottom surface portion 434 is formed as a plate-shaped member parallel to the top plate 30 of the cover member 3 in such a manner that the erroneous recording prevention hole 432 is formed at the front 25 of the cover member 3.

At the internal end side of the portion extending on the top plate 30 of the guide recessed portion 433, as described later, an insertion groove 429 is formed into which an insertion piece 441 provided at the erroneous recording prevention member 437 is inserted.

Moreover, at the inner surface side of the top plate 30 of the cover member 3 opposite to the internal end of the guide recessed portion 433, an engagement recessed portion 436 is formed with which the insertion piece 441 of the erroneous recording prevention member 437 is engaged. The part of the engagement recessed portion 436 formed of the top plate 30 serves as a pressing supporting portion 435 of the insertion portion 441.

Figure 30:
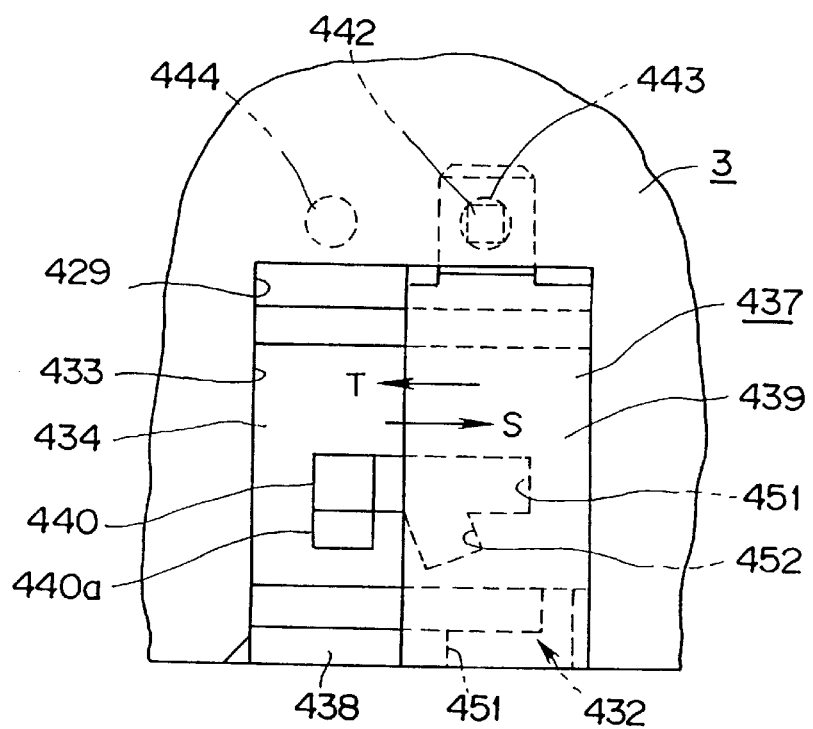
FIG. 30 is a plan view showing the erroneous recording prevention member of FIG. 27 moved to its first position.
Figure 31:
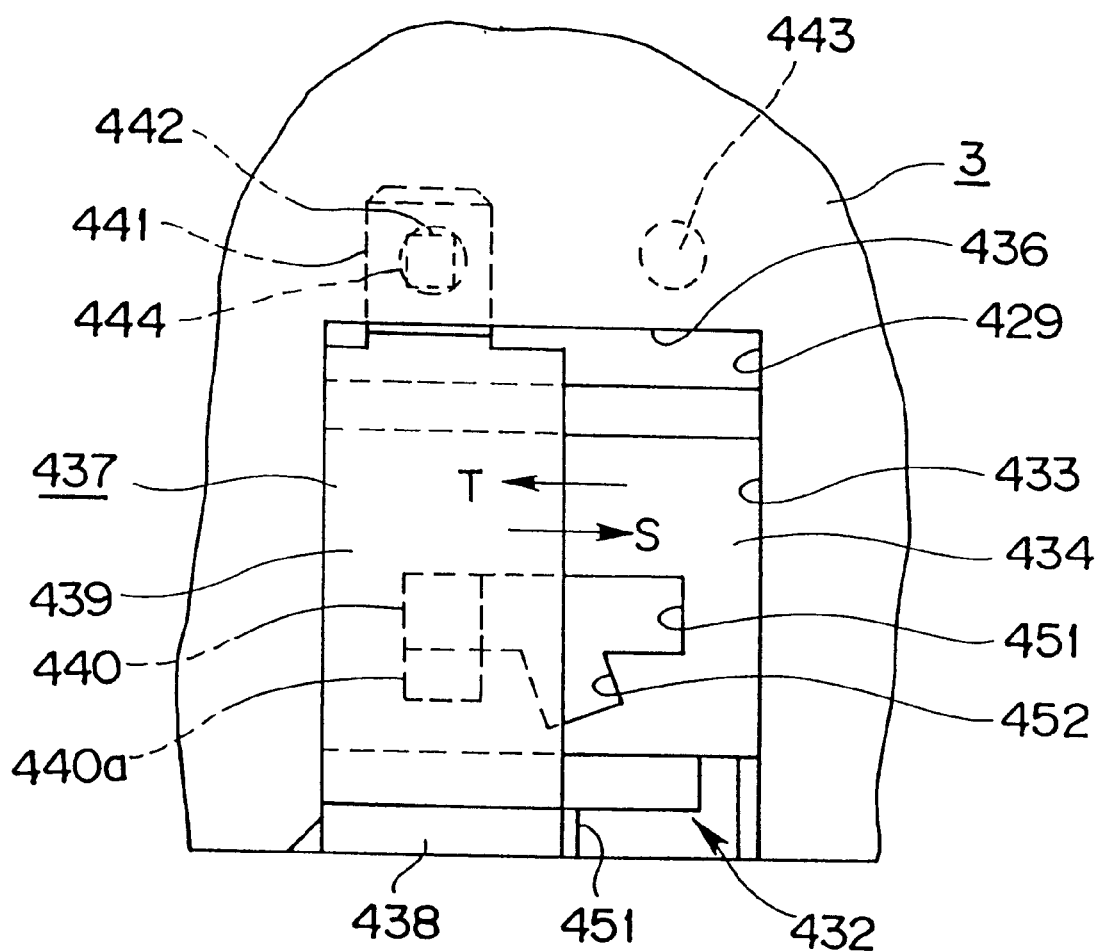
FIG. 31 is a plan view showing the erroneous recording prevention member of FIG. 27 moved to its second position.

Further, within the engagement recessed portion 436, first and second holding recessed portions 443, 444 are provided which form the positioning mechanism such that when the erroneous recording prevention member 437 disposed within the guide recessed portion 433 is moved to the first position where it closes the erroneous recording detection hole 432 shown in FIG. 30 and the second position where it opens the erroneous recording detection hole 432 as shown in FIG. 31, a holding projection 442 projecting from the insertion piece 441 is engaged with the respective first and second holding recessed portions 443, 444, thus to provide positioning when moved to the first and second positions of the erroneous recording prevention member.

At the bottom surface portion 434 of the guide recessed portion 433, as shown in FIG. 27, there is formed, as shown in FIG. 27, an engagement groove 451 with which an engagement projection 440 projecting from the lower surface of the base end side of a movement guide piece 439 of the erroneous recording prevention member 437 is engaged. This engagement groove 451 is formed as a penetrated cut groove in the bottom surface portion 434. Further, the engagement groove 451 is formed in parallel to the front portion 2a of the cartridge body 2 which is the movement direction of the erroneous recording prevention member 437. In addition, an insertion groove 452 is formed at the engagement groove 451 for allowing a holding pawl 440a to be inserted therethrough as a holding portion provided at the front end side of the engagement projection 440. This insertion groove 452 is obliquely formed with respect to the length direction of the engagement groove 451.

Meanwhile, the erroneous recording detection hole 432 opened and closed by the erroneous recording prevention member 437 is provided at the front portion 25 of the cover member 3 positioned within the guide recessed portion 433. This erroneous recording detection hole 432 is provided at the position opposite to the detection element of the erroneous recording detection mechanism disposed at the recording/reproduction unit side when the tape cartridge 401 is loaded into the recording/reproduction unit. In addition, the erroneous recording detection hole 432 allows the detection element of the erroneous recording detection mechanism to project into the cartridge body 2.

Figure 28:
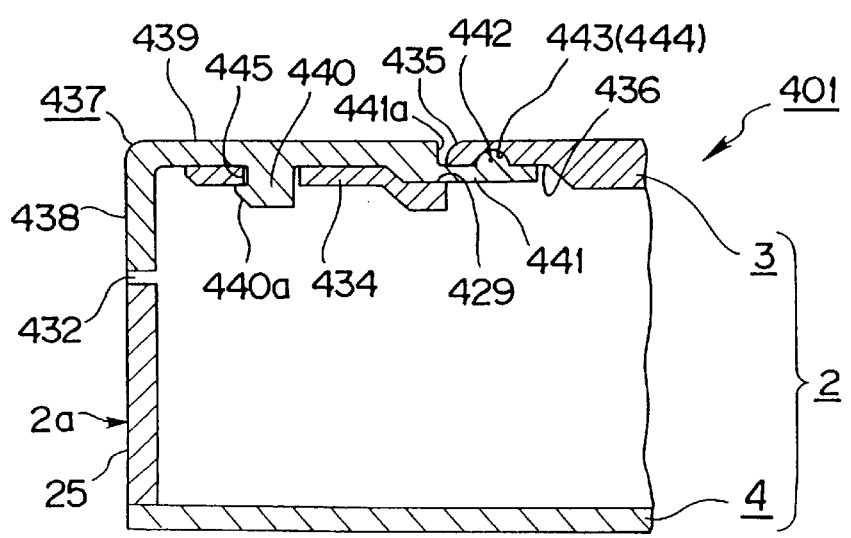
FIG. 28 is a cross sectional view showing the erroneous recording prevention member of FIG. 27 attached to the cartridge body.

Further, the erroneous recording prevention member 437 attached to the cover member 3 and positioned within the guide recessed portion 433 includes, at the base end portion side thereof, as shown in FIGS. 27 and 28, a portion of a detection member (detected portion when viewed from the recording medium device) 438 for actuating the erroneous recording detection mechanism disposed at the recording/reproduction unit side, and a holding portion 445 for holding or clamping a bottom surface portion 434 of the guide recessed portion 433 which is a portion of the cover member 3 and is provided at the base end portion side including the portion of the detection member 438. This holding portion 445 is formed by a movement guide piece 439 serving as a movement guide portion projecting substantially vertically from the portion of the detection member 438 and extending toward the top plate 30 side portion of the guide recessed portion 433 and an engagement projection 440 engaged with the engagement groove 451 within the guide recessed portion 433 projecting from the lower surface side of the movement guide piece 439. Namely, as shown in FIG. 28, the holding portion 445 forms a channel-shaped portion of the movement guide piece 439 in cooperation with the engagement projection 440 provided with a holding pawl 440a at the front end portion thereof.

At the front end side of the movement guide piece 439 of the erroneous recording prevention member 437, the insertion piece 441 projects therefrom such that when the erroneous recording prevention member 437 is attached to the cover member 3, the inserted piece 441 is inserted into an insertion groove 429 provided at the bottom surface portion 434 of the guide recessed portion 433 and is inserted toward the inner surface side of the top plate 30 of the cover member 3. This insertion piece 441 projects from the lower end side of the front end side of the movement guide piece 439 and an offset portion 441a is formed on the upper surface of the continuously connecting portion side of the movement guide piece 439. This offset portion 441a has a height substantially equal to the thickness of the pressing supporting portion 435 of the cover member 3 side.

At the upper surface side of the insertion piece 441, the holding projection 442 projects therefrom and is engaged with the first and second holding recessed portions 443, 444 formed within the engagement recessed portion 436 provided at the cover member 3 side.

Figure 29:
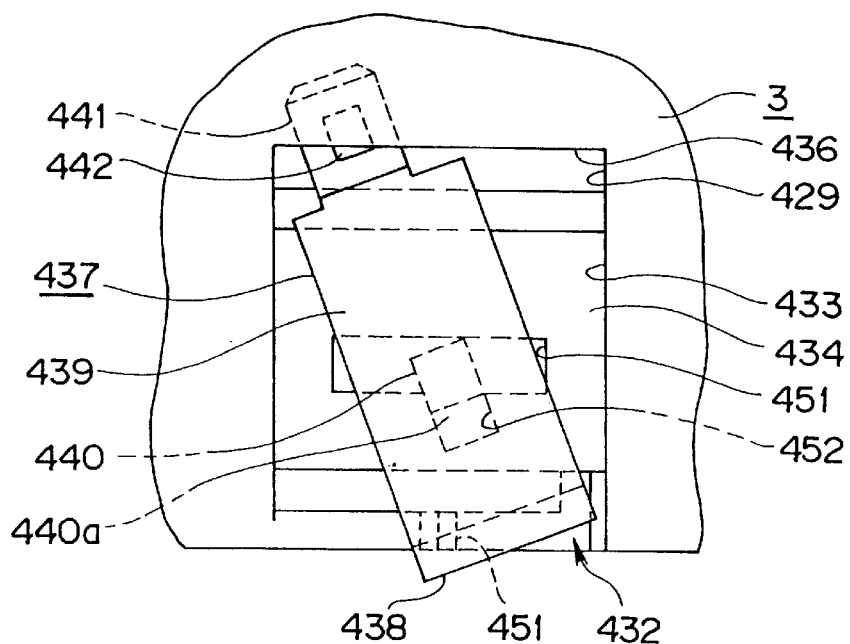
FIG. 29 is a plan view showing the erroneous recording prevention member of FIG. 27 attached to the cartridge body.

In order to attach the erroneous recording prevention member 437 designed as described above, the insertion piece 441 is inserted into the engagement recessed portion 436, and the holding pawl 440a provided at the front end side of the engagement projection 440 is disposed on a surface of the cartridge body 2 in a manner opposite to the insertion groove 452 of the engagement groove 451. At this time, since the insertion groove 452 is obliquely formed with respect to the engagement groove 451 in parallel to the front portion 2a of the cartridge body 2, the erroneous recording prevention member 437 is obliquely disposed with respect to the guide recessed portion 433 as shown in FIG. 29. When the engagement projection 440 is caused to be passed through the engagement groove 451 to rotate the erroneous recording prevention member 437 in a manner such that it is parallel to the guide recessed portion 433, the holding pawl 440a holds the lower surface side of the bottom surface portion 434 as shown in FIG. 28. As a result, the bottom surface portion 434 is clamped or held by the holding portion 445 formed by the engagement projection 440 and the movement guide piece 439. Thus, attachment with respect to the cartridge body 2 of the erroneous recording prevention member 434 is performed.

When the erroneous recording prevention member 437 is attached in this way, the insertion piece 441 comes into pressure contact with the internal surface side of the cartridge body 2 while undergoing elastic displacement. In this case, elastic repulsive force of the insertion piece 441 is applied in a manner to press the internal surface thereof onto the bottom surface portion 434 of the guide recessed portion 433 with respect to the movement guide piece 439 as reactive force. Thus, the bottom surface portion 434 of the guide recessed portion 433 is held or clamped by the movement guide piece 439 and the engagement projection 440, and the erroneous recording prevention member 437 is securely combined with the guide recessed portion 433 therewithin by the elastic repulsive force of the insertion piece 441 applied to the engagement projection 440. As a result, slipping off is prevented.

In the condition where the erroneous recording prevention member 437 is attached to the guide recessed portion 433 by the above-described operation, the engagement projection 422 provided on the insertion piece 441 is relatively engaged with any one of the first and second holding recessed portions 443, 444 provided within the engagement recessed portion 436 as shown in FIGS. 30 and 31. The engagement state between the holding projection 442 and the holding recessed portions 434, 444 is securely held by elastic repulsive force of the insertion portion 441. At this time, the portion of the detection member 438 of the erroneous recording prevention member 437 is opposed to the front portion 25 of the cover member 3 where the erroneous recording detection hole 332 is formed as shown in FIG. 28.

The erroneous recording prevention member 437 secured within the guide recessed portion 433 provided at the cover member 3 is moved in the direction indicated by arrow S and in the direction indicated by arrow T in FIGS. 30 and 31 along the front portion 2a of the cartridge body 2 while the engagement projection 440 is guided by the engagement groove 451 and the insertion piece 441 is guided by the engagement recessed portion 436. When the erroneous recording prevention member 437 is moved from the first position shown in FIG. 30 to the second position shown in FIG. 31, or from the second position shown in FIG. 31 to the first position shown in FIG. 30, the insertion portion 441 is caused to undergo elastic displacement in the thickness direction thereof. As a result, the holding projection 441 engaged with the first or second holding recessed portion 443 or 444 is moved riding on the bottom surface of the engagement recessed portion 436. When the erroneous recording prevention member 437 is moved to the first or second position, the holding projection 441 is relatively engaged with the first or second holding recessed portion 443 or 444, and is held at the first or second position. Thus, the erroneous recording prevention member 437 is securely held at the first or second position.

Moreover, at the lower edge portion positioned at the front portion 25 of the cover member 3 of the guide recessed portion 433, a position limiting projection 451 projects therefrom such that when the erroneous recording prevention member 437 is moved to the first or second position, the position limiting projection 451 is held on the side surface of the portion of the detection member 438 to limit the movement position of the erroneous recording prevention member 437. As the result, the erroneous recording prevention member 437 is more securely held at the first or second position by the position limiting mechanism formed of the holding projection 441 and the first or second holding recessed portion 443 or 444 with which the holding projection 451 is engaged.

Meanwhile, in the tape cartridge 401 of this embodiment, when the erroneous recording prevention member 437 is moved to (or located at) the first position as shown in FIG. 30 to one side of the cartridge body 2 where the portion of the detection member 438 closes the erroneous recording detection hole 432 provided at the front portion 25 of the cover member 3, recording of information signals can be made with respect to the magnetic tape 12 accommodated within the cartridge body 2. In addition, when the erroneous recording prevention member 437 is moved in the direction indicated by arrow T in FIG. 30 from the first position shown in FIG. 30 to the second position where the portion of the detection member 438 opens the erroneous recording detection hole 432 as shown in FIG. 31, recording of information signals with respect to the magnetic tape 12 accommodated within the cartridge body 2 is not permitted to be performed.

Namely, in the recording/reproduction unit into which the tape cartridge 401 of this embodiment is loaded, a detection mechanism is provided for detecting the portion of the detection member 438 of the erroneous recording prevention member 437. When the portion of the detection member 438 is detected by the detection mechanism of the recording/reproduction unit (apparatus), selection of the recording operation mode for permitting recording of information signals with respect to the magnetic tape 12 can be determined. When detection of the portion of the detection member 438 is not carried out by the detection mechanism, selection of the recording operation mode is impossible.

While, in this embodiment, the erroneous recording detection hole 432 is formed so as to have a width extending over the range of the guide recessed portion 433 where the erroneous recording prevention member 437 is disposed, it is sufficient to provide an erroneous recording detection hole 432 formed only at a portion opposed to the detection mechanism of the recording/reproduction unit. Namely, the erroneous recording prevention member 437 may be formed so as to have a size (dimensions) covered by the portion of the detection member 438 when it is moved to the first position as shown in FIG. 30.

While, in the above-described tape cartridges of the respective embodiments, the erroneous recording detection hole is positioned within the guide recessed portion provided at the cover member to be opened at the front portion thereof, it may, however be positioned at any surface position thereof and opened thereat. In this case, in the erroneous recording prevention member, e.g., a portion of the base end portion side of the movement guide piece is also designed as a portion of the detection member.

In addition, this invention is not limited to the tape cartridges in which magnetic tape is accommodated within the cartridge body, but also may be applied to disc cartridges in which disc-shaped recording medium such as optical disc or magneto-optical disc, etc. is rotatably accommodated within the cartridge body. In this situation, advantages similar to the previously described advantages will be attained.

In the recording medium device according this invention, the erroneous recording prevention member is attached to the cartridge body so that the portion of the detection member can be moved within the range between the first position and the second position. This erroneous recording prevention member is secured in the first and the second position by holding or clamping a portion of the cartridge body by the holding portion provided at the base end portion side where the portion of the detection member is provided and inserting the insertion portion provided at the front end side of the holding portion toward the interior of the cartridge body. Accordingly, easy withdrawal from the cartridge body is prevented. Thus, the erroneous recording prevention member is moved within the range between the first position and the second position in a stable state.

Particularly, since the erroneous recording prevention member is attached to the cartridge body so that the insertion portion is inserted into the cartridge body such that repulsive forces come into pressure contact with the inner surface side of the cartridge body, the erroneous recording prevention member is attached so that it is elastically held with respect to the cartridge body by the holding portion and the insertion portion. Thus, a firm attachment state of the erroneous recording prevention member is attained.

While the present invention has been particularly shown and described with reference to certain preferred embodiments, it will be readily apparent to those of ordinary skill in the art that various changes and modifications may be made therein without departing form the spirit and scope of this invention. It is intended that the appended claims be interpreted as including the foregoing as well as various other such changes and modifications.

We claim:

1. A recording medium device for use in a recording/reproducing apparatus comprising:

a cartridge body accommodating a recording medium on which information signals are recorded, said cartridge body having a cover member and a base plate joined to each other, said member including a top plate which has an inner surface portion facing said base plate;

an erroneous recording prevention member attached to the cartridge body and including a detection member at a base end portion side thereof detected by detection means of the recording/reproducing apparatus, said erroneous recording prevention member being movable between a first position, where the detection member is detected by the detection means, and a second position, where the detection member is not detected by the detection means, wherein the erroneous recording prevention member is attached to the cartridge body so that the detection member can be moved between the first position and the second position by retaining the cartridge body by a holding portion provided at the base end portion side and inserting an insertion portion provided at a front end side of the holding portion from the external side toward the internal side of the cartridge body into an engagement recessed portion of the cartridge body, and positioning means for securely retaining said erroneous recording prevention member in its said first and second positions wherein said positioning means includes a projection member extending from said insertion portion which is engaged with first and second recessed portions integrally formed in the facing inner surface portion of said top plate of said cover member when said erroneous recording prevention member is moved between its said first and second positions such that said erroneous recording prevention member remains in substantially the same horizontal and vertical planes as two of the outer surfaces of said cartridge body when said erroneous recording prevention member is moved between its said first and second positions and wherein said projection member extends upwardly from a projection plane and substantially parallel to the horizontal plane of one of said outer surfaces and said first and second recessed portions are formed in a plane substantially parallel to the projection plane of said projection member.

2. A recording medium device as set forth in claim 1, wherein the erroneous recording prevention member is attached to the cartridge body so that the insertion portion is inserted into the cartridge body achieving a repulsive force in pressure contact with the inner surface side of the cartridge body.

3. A recording medium device as set forth in claim 1, wherein the holding portion of the erroneous recording prevention member includes a movement guide portion projecting from the detection member and extends along the surface of the external side of the cartridge body and a supporting portion projecting from the detection member opposite to the movement guide portion and inserted into the cartridge body, and the insertion portion being provided at the front end side of the movement guide portion.

4. A recording medium device as set forth in claim 3, wherein the erroneous recording prevention member is attached to the cartridge body so that the movement guide portion is projected with respect to the detection member in a direction substantially perpendicular thereto, the detection member facing toward the front side of the cartridge body, and the movement guide portion is extended toward the external side of a principal surface perpendicular to the front side of the cartridge body.

5. A recording medium device as set forth in claim 4, wherein the cartridge body is secured by the holding portion of the erroneous recording prevention member at a bottom surface portion of a recessed portion thereof.

6. A recording medium device as set forth in claim 1, wherein the erroneous recording prevention member is attached to the cartridge body so that it can be moved within a guide recessed portion formed at the outer circumferential surface of the cartridge body.

7. A recording medium device as set forth in claim 5, wherein the engagement recessed portion with which the insertion portion is engaged is formed at an inner surface side of the cartridge body.

8. A recording medium device as set forth in claim 1, wherein an erroneous recording prevention hole is provided in the cartridge body such that when the erroneous recording prevention member is moved between its said first position and its said second position, the erroneous recording prevention hole is opened or closed by the detection member.

9. A recording medium device as set forth in claim 1, wherein the erroneous recording prevention member is moved between its said first position and its said second position along the front side of the cartridge body, whereby the detection member is consequently moved to respectively open and close an erroneous recording prevention hole provided at the front side of the cartridge body.

10. A recording medium device as set forth in claim 1, wherein the erroneous recording prevention member is formed by molding synthetic resin material at least including polyacetal resin or ABS resin.

11. A recording medium device for use in a recording/reproducing apparatus comprising:
a cartridge body accommodating a recording medium on which information signals are recorded, said cartridge body having a cover member and a base plate joined to each other, said cover member including a top plate which has an inner surface portion facing said base plate;
an erroneous recording prevention member including a detection member at the base end portion side thereof attached to the cartridge body and detected by detection means of the recording/reproducing apparatus, said erroneous recording prevention member being movable between a first position, where the detection member is moved to the front side of the cartridge body to be detected by the detection means as an erroneous recording detection opening is closed to permit recording on the information medium, and a second position, where the detection member is moved toward the interior of the cartridge body in a direction perpendicular to the front side of the cartridge body where the detection member is not detected by the detection means as the erroneous recording detection opening is opened to prevent recording on the information medium, wherein the erroneous recording prevention member includes a holding portion having a movement guide portion projecting from the detection member and extending along an external surface of the cartridge body and a supporting portion projecting from the detection member opposite to the movement guide portion and which is inserted into the cartridge body, said erroneous recording prevention member being attached to the cartridge body so that the detection member can be moved between the first position and the second position by retaining the cartridge body with the holding portion and inserting an insertion portion provided at a front end side of the holding portion from the exterior toward the interior of the cartridge body; and
positioning means for securely retaining said erroneous recording prevention member in its said first and second positions wherein said positioning means includes a projection member extending from said insertion portion which is engaged with first and second recessed portions integrally formed in the facing inner surface portion of said top plate of said cover member when said erroneous recording prevention member is moved between its said first and second positions and wherein when said erroneous recording prevention member is moved to its said second position, said erroneous recording detection opening is formed along two mutual perpendicular surfaces of the cartridge body and wherein said projection member extends upwardly from a projection plane substantially parallel to a horizontal plane of one of said perpendicular surfaces of said cartridge body and said first and second recessed portions are formed in a plane substantially parallel to the projection plane of said projection member.

12. A recording medium device as set forth in claim 11, wherein the erroneous recording prevention member is attached to the cartridge body so that the insertion portion is inserted into the cartridge body achieving a repulsive force in pressure contact with the internal surface side of the cartridge body.

13. A recording medium device as set forth in claim 11, wherein the erroneous recording prevention member is attached to the cartridge body so that it can be moved between its said first position and its said second position while being guided by a guide recessed portion formed at the outer circumferential surface side of the cartridge body.

14. A recording medium device for use in a recording/reproducing apparatus comprising:
a cartridge body accommodating a recording medium on which information signals are recorded;
an erroneous recording prevention member including a detection member attached to the cartridge body detected by detection means of the recording/reproducing apparatus, said erroneous recording prevention member being rotatable between a first position, where the detection member is detected by the detection means as an erroneous recording detection opening is closed to permit recording of information medium, and a second position, where the detection member is not detected by the detection means as the erroneous recording detection opening is opened to prevent recording on the information medium; and
rotational fulcrum means for providing rotation of said erroneous recording prevention member between its said first and second positions,
wherein the erroneous recording prevention member includes a holding portion of a rotational guide portion projecting from the detection member and extending along an external surface of the cartridge body and a supporting portion projecting from the detection member opposite to the rotational guide portion and inserted into the cartridge body, said detection member being rotatable between the first position and the second position with the rotational fulcrum means acting as a center pivot with said holding portion retaining the cartridge body and inserting an insertion portion provided at a front end side of the holding portion from the exterior toward the interior of the cartridge body through a guide recessed portion of the cartridge body;
and wherein said rotational fulcrum means includes an engagement projection extending from said insertion portion which engages an engagement hole formed at the internal surface of said cartridge body and said holding portion includes a holding projection which engages a holding recessed portion of the guide recessed portion when the erroneous recording prevention member is moved and retained in its said first position and said holding projection is disengaged from said holding recessed portion of the guide recessed portion when the erroneous recording prevention member is moved to its said second position.

15. A recording medium device as set forth in claim 14, wherein the erroneous recording prevention member is attached to the cartridge body so that the insertion portion is inserted into the cartridge body achieving a repulsive force in pressure contact with the internal surface side of the cartridge body.

16. A recording medium device as set forth in claim 14, wherein the erroneous recording prevention member is attached to the cartridge body so that it can be rotated within the guide recessed portion formed at the outer circumferential surface side of the cartridge body.

17. A recording medium device as set forth in claim 16, wherein the bottom surface portion of the guide recessed portion is clamped by the holding portion of the erroneous recording prevention member.

18. A recording medium device as set forth in claim 14,
  wherein the erroneous recording prevention member is rotated while undergoing movement within the range between the front side and the internal side of the cartridge body where the engagement projection is guided by the elongated hole to thereby move the detection member between its said first position and its said second position.

19. A recording medium device for use in a recording/reproducing apparatus comprising:
  a cartridge body accommodating a recording medium on which information signals are recorded, said cartridge body having a cover member and a base plate joined to each other, said cover member including a top plate which as an inner surface portion facing said base plate; and
  an erroneous recording prevention member including a detection member attached to said cartridge body and detected by detection means of the recording/reproducing apparatus, said erroneous recording prevention member being movable between a first position, where the detection member is detected by the detection means as an erroneous recording detection opening is closed to permit recording of information medium, and a second position, where the detection member is not detected by the detection means as the erroneous recording detection opening is opened to prevent recording of the information medium,
  wherein the erroneous recording prevention member includes a movement guide portion projecting from the detection member and extending along the surface of an external side of the cartridge body, and an engagement projection projecting substantially perpendicularly from the movement guide portion and relatively engaged with an engagement groove provided within the cartridge body, said erroneous recording prevention member being attached to the cartridge body by inserting an insertion portion provided at the front end side of the movement guide portion from the exterior toward the interior of the cartridge body wherein the insertion portion includes an engagement projection which engages first and second recessed portions integrally formed in the facing inner surface portion of said top plate of said cover member such that said erroneous recording prevention member remains in substantially the same horizontal and vertical planes as two of the outer surfaces of said cartridge body when said erroneous recording prevention member is moved between its said first and second positions and wherein said engagement projection extends upwardly from a projection plane substantially parallel to the horizontal plane of one of outer surfaces and said first and second recessed portions are formed in a plane substantially parallel to the plane of said engagement projection.

20. A recording medium device as set forth in claim 19, wherein the erroneous recording prevention member is attached to the cartridge body so that the insertion portion is inserted into the cartridge body achieving a repulsive force in pressure contact with the internal surface side of the cartridge body.

21. A recording medium device as set forth in claim 19, wherein the engagement groove is formed by a cut groove having a width substantially equal to the width of the engagement projection of the erroneous recording prevention member and having a cut portion for permitting a holding pawl of the engagement projection to be retained thereby.

* * * * *